US012387900B2

(12) United States Patent
Procter et al.

(10) Patent No.: US 12,387,900 B2
(45) Date of Patent: Aug. 12, 2025

(54) SYSTEMS AND METHODS FOR REAL-TIME ENERGY AND DOSE MONITORING OF AN X-RAY LINEAR ACCELERATOR

(71) Applicant: Rapiscan Holdings, Inc., Hawthorne, CA (US)

(72) Inventors: Mark Procter, Wilmslow (GB); Steve Dodds, Newcastle-under-Lyme (GB); Michael Jenkins, Brown Edge (GB)

(73) Assignee: Rapiscan Holdings, Inc., Hawthorne, CA (US)

( * ) Notice: Subject to any disclaimer, the term of this patent is extended or adjusted under 35 U.S.C. 154(b) by 176 days.

(21) Appl. No.: 18/154,181

(22) Filed: Jan. 13, 2023

(65) Prior Publication Data

US 2023/0245847 A1 Aug. 3, 2023

Related U.S. Application Data

(60) Provisional application No. 63/267,526, filed on Feb. 3, 2022.

(51) Int. Cl.
*H01J 35/14* (2006.01)
*G01T 1/02* (2006.01)
(Continued)

(52) U.S. Cl.
CPC ............... *H01J 35/14* (2013.01); *G01T 1/02* (2013.01); *G01T 1/1606* (2013.01); *H01J 35/025* (2013.01)

(58) Field of Classification Search
None
See application file for complete search history.

(56) References Cited

U.S. PATENT DOCUMENTS

| 2,636,619 A | 4/1953 | Alexander |
| 3,275,831 A | 9/1966 | Martin |

(Continued)

FOREIGN PATENT DOCUMENTS

| AT | 406586 T | 9/2008 |
| AT | 553401 T | 4/2012 |

(Continued)

OTHER PUBLICATIONS

"Oral Program of SORMA West 2008", Jun. 5, 2008, pp. 1-95, XP055167963, Retrieved from the Internet: URL: http://www2.lbl.gov/conferences/SORMA/assets/doc/SORMAOralProgram30May.pdf.

(Continued)

*Primary Examiner* — Hoon K Song
(74) *Attorney, Agent, or Firm* — Novel IP

(57) ABSTRACT

A linear accelerator in data communication with a computing device and a programmable logic controller and including a magnetron, an electron gun that is configured to direct an accelerated beam of electrons at a target thereby generating a beam of X-rays, a primary collimator positioned beyond the target in a direction of the beam of X-rays, a secondary collimator coupled to an end of the primary collimator at which the beam of X-rays exit the primary collimator, an attenuating element and a calorimeter positioned within the primary collimator, and a reference detector positioned within the secondary collimator and configured to measure an X-ray radiation dose output of the linear accelerator on a pulse-by-pulse basis.

22 Claims, 15 Drawing Sheets

(51) Int. Cl.
   *G01T 1/16* (2006.01)
   *H01J 35/02* (2006.01)

(56) References Cited

U.S. PATENT DOCUMENTS

| | | |
|---|---|---|
| 3,374,355 A | 3/1968 | Parratt |
| 3,439,166 A | 4/1969 | Chope |
| 3,837,502 A | 9/1974 | Hornagold |
| 3,904,923 A | 9/1975 | Schwartz |
| 3,919,467 A | 11/1975 | Peugeot |
| 4,164,138 A | 8/1979 | Burkhart |
| 4,239,969 A | 12/1980 | Galetta |
| 4,658,408 A | 4/1987 | Amor |
| 4,831,260 A | 5/1989 | Dibianca |
| 4,998,270 A | 3/1991 | Scheid |
| 5,014,293 A | 5/1991 | Boyd |
| 5,040,199 A | 8/1991 | Stein |
| 5,041,728 A | 8/1991 | Spacher |
| 5,065,418 A | 11/1991 | Bermbach |
| 5,181,234 A | 1/1993 | Smith |
| 5,185,778 A | 2/1993 | Magram |
| 5,197,088 A | 3/1993 | Vincent |
| 5,202,932 A | 4/1993 | Cambier |
| 5,259,012 A | 11/1993 | Baker |
| 5,319,696 A | 6/1994 | Abdel-Malek |
| 5,321,271 A | 6/1994 | Schonberg |
| 5,363,940 A | 11/1994 | Fahrion |
| 5,418,372 A | 5/1995 | Schonberg |
| 5,493,596 A | 2/1996 | Annis |
| 5,503,424 A | 4/1996 | Agopian |
| 5,600,303 A | 2/1997 | Husseiny |
| 5,606,167 A | 2/1997 | Miller |
| 5,661,377 A | 8/1997 | Mishin |
| 5,692,028 A | 11/1997 | Geus |
| 5,692,029 A | 11/1997 | Husseiny |
| 5,838,759 A | 11/1998 | Armistead |
| 5,842,578 A | 12/1998 | Cordeiro |
| 5,909,478 A | 6/1999 | Polichar |
| 5,910,973 A | 6/1999 | Grodzins |
| 5,940,468 A | 8/1999 | Huang |
| 5,949,811 A | 9/1999 | Baba |
| 5,974,111 A | 10/1999 | Krug |
| 6,056,671 A | 5/2000 | Marmer |
| 6,067,344 A | 5/2000 | Grodzins |
| 6,081,580 A | 6/2000 | Grodzins |
| 6,151,381 A | 11/2000 | Grodzins |
| 6,192,104 B1 | 2/2001 | Adams |
| 6,216,540 B1 | 4/2001 | Nelson |
| 6,220,099 B1 | 4/2001 | Marti |
| 6,249,567 B1 | 6/2001 | Rothschild |
| 6,292,533 B1 | 9/2001 | Swift |
| 6,301,327 B1 | 10/2001 | Martens |
| 6,320,933 B1 | 11/2001 | Grodzins |
| 6,347,132 B1 | 2/2002 | Annis |
| 6,418,194 B1 | 7/2002 | McPherson |
| 6,424,695 B1 | 7/2002 | Grodzins |
| 6,438,201 B1 | 8/2002 | Mazess |
| 6,459,761 B1 | 10/2002 | Grodzins |
| 6,459,764 B1 | 10/2002 | Chalmers |
| 6,504,898 B1 | 1/2003 | Kotler |
| 6,507,027 B1 | 1/2003 | Kojima |
| 6,542,574 B2 | 4/2003 | Grodzins |
| 6,542,580 B1 | 4/2003 | Carver |
| 6,546,072 B1 | 4/2003 | Chalmers |
| 6,552,346 B2 | 4/2003 | Verbinski |
| 6,614,872 B2 | 9/2003 | Bueno |
| 6,658,087 B2 | 12/2003 | Chalmers |
| 6,665,373 B1 | 12/2003 | Kotowski |
| 6,702,459 B2 | 3/2004 | Barnes |
| 6,713,773 B1 | 3/2004 | Lyons |
| 6,714,620 B2 | 3/2004 | Caflisch |
| 6,843,599 B2 | 1/2005 | Le |
| 6,847,040 B2 | 1/2005 | Strommer |
| 6,920,197 B2 | 7/2005 | Kang |
| 6,924,487 B2 | 8/2005 | Bolozdynya |
| 6,928,141 B2 | 8/2005 | Carver |
| 6,940,071 B2 | 9/2005 | Ramsden |
| 6,944,263 B2 | 9/2005 | Xiao |
| 7,010,094 B2 | 3/2006 | Grodzins |
| 7,039,159 B2 | 5/2006 | Muenchau |
| 7,046,768 B1 | 5/2006 | Gilevich |
| 7,095,326 B2 | 8/2006 | Young |
| 7,099,434 B2 | 8/2006 | Adams |
| RE39,396 E | 11/2006 | Swift |
| 7,151,447 B1 | 12/2006 | Willms |
| 7,202,478 B2 | 4/2007 | Ramsden |
| 7,203,276 B2 | 4/2007 | Arsenault |
| 7,207,713 B2 | 4/2007 | Lowman |
| 7,215,737 B2 | 5/2007 | Li |
| 7,215,738 B2 | 5/2007 | Muenchau |
| 7,218,704 B1 | 5/2007 | Adams |
| 7,239,245 B2 | 7/2007 | Kang |
| 7,244,947 B2 | 7/2007 | Polichar |
| 7,272,208 B2 | 9/2007 | Yatsenko |
| 7,302,035 B2 | 11/2007 | Hu |
| 7,322,745 B2 | 1/2008 | Agrawal |
| 7,352,843 B2 | 4/2008 | Hu |
| 7,352,844 B1 | 4/2008 | Muenchau |
| 7,366,282 B2 | 4/2008 | Peschmann |
| 7,369,642 B2 | 5/2008 | Eilbert |
| 7,369,643 B2 | 5/2008 | Kotowski |
| 7,372,040 B2 | 5/2008 | Polichar |
| 7,372,944 B2 | 5/2008 | Bernhardt |
| 7,379,530 B2 | 5/2008 | Hoff |
| 7,386,093 B2 | 6/2008 | Wu |
| 7,388,209 B1 | 6/2008 | Gormley |
| 7,391,849 B2 | 6/2008 | Smith |
| 7,397,891 B2 | 7/2008 | Johnson |
| 7,399,976 B2 | 7/2008 | Kang |
| 7,400,701 B1 | 7/2008 | Cason |
| 7,400,706 B2 | 7/2008 | Li |
| 7,417,440 B2 | 8/2008 | Peschmann |
| 7,418,077 B2 | 8/2008 | Gray |
| 7,453,987 B1 | 11/2008 | Richardson |
| 7,456,780 B1 | 11/2008 | Garren |
| 7,470,914 B2 | 12/2008 | Li |
| 7,471,764 B2 | 12/2008 | Kaval |
| 7,483,510 B2 | 1/2009 | Carver |
| 7,486,768 B2 | 2/2009 | Allman |
| 7,499,522 B2 | 3/2009 | Chen |
| 7,504,635 B2 | 3/2009 | Ramsden |
| 7,505,556 B2 | 3/2009 | Chalmers |
| 7,508,908 B2 | 3/2009 | Hu |
| 7,512,212 B2 | 3/2009 | Li |
| 7,517,149 B2 | 4/2009 | Agrawal |
| 7,519,148 B2 | 4/2009 | Kotowski |
| 7,525,101 B2 | 4/2009 | Grodzins |
| 7,526,064 B2 | 4/2009 | Akery |
| 7,538,325 B2 | 5/2009 | Mishin |
| 7,547,887 B2 | 6/2009 | Ramsden |
| 7,555,099 B2 | 6/2009 | Rothschild |
| 7,570,737 B2 | 8/2009 | Kang |
| 7,579,845 B2 | 8/2009 | Peschmann |
| 7,580,505 B2 | 8/2009 | Kang |
| 7,593,506 B2 | 9/2009 | Cason |
| 7,593,510 B2 | 9/2009 | Rothschild |
| 7,596,275 B1 | 9/2009 | Richardson |
| 7,634,055 B2 | 12/2009 | Hu |
| 7,647,189 B2 | 1/2010 | Kang |
| 7,660,388 B2 | 2/2010 | Gray |
| 7,663,109 B2 | 2/2010 | Kang |
| 7,683,336 B2 | 3/2010 | Ramsden |
| 7,684,538 B2 | 3/2010 | Morton |
| 7,684,541 B2 | 3/2010 | Wang |
| 7,702,070 B2 | 4/2010 | Kang |
| 7,709,818 B2 | 5/2010 | Matsuda |
| 7,720,195 B2 | 5/2010 | Allman |
| 7,722,251 B2 | 5/2010 | Kang |
| 7,724,868 B2 | 5/2010 | Morton |
| 7,742,568 B2 | 6/2010 | Smith |
| 7,760,852 B2 | 7/2010 | Chen |
| 7,769,133 B2 | 8/2010 | Carver |
| 7,783,004 B2 | 8/2010 | Kotowski |
| 7,783,005 B2 | 8/2010 | Kaval |

(56) References Cited

U.S. PATENT DOCUMENTS

| | | |
|---|---|---|
| 7,807,964 B2 | 10/2010 | Li |
| 7,809,104 B2 | 10/2010 | Foland |
| 7,817,775 B2 | 10/2010 | Kang |
| 7,817,776 B2 | 10/2010 | Agrawal |
| 7,820,973 B2 | 10/2010 | Ruan |
| 7,852,981 B2 | 12/2010 | Luo |
| 7,856,081 B2 | 12/2010 | Peschmann |
| 7,860,213 B2 | 12/2010 | Akery |
| 7,864,920 B2 | 1/2011 | Rothschild |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,975 B2 | 4/2011 | Zhang |
| 7,928,400 B1 | 4/2011 | Diawara |
| 7,929,663 B2 | 4/2011 | Morton |
| 7,942,576 B2 | 5/2011 | Zhao |
| 7,947,957 B2 | 5/2011 | Ruan |
| 7,949,101 B2 | 5/2011 | Morton |
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 7,995,707 B2 | 8/2011 | Rothschild |
| 8,013,297 B2 | 9/2011 | Peng |
| 8,054,937 B2 | 11/2011 | Langeveld |
| 8,054,938 B2 | 11/2011 | Kaval |
| 8,059,781 B2 | 11/2011 | Agrawal |
| 8,073,099 B2 | 12/2011 | Niu |
| 8,084,748 B2 | 12/2011 | Peng |
| 8,085,897 B2 | 12/2011 | Morton |
| 8,094,784 B2 | 1/2012 | Morton |
| 8,129,691 B2 | 3/2012 | Hu |
| 8,135,110 B2 | 3/2012 | Morton |
| 8,138,770 B2 | 3/2012 | Peschmann |
| 8,170,177 B2 | 5/2012 | Akery |
| 8,204,173 B2 | 6/2012 | Betcke |
| 8,217,365 B2 | 7/2012 | Chen |
| 8,223,919 B2 | 7/2012 | Morton |
| 8,243,876 B2 | 8/2012 | Morton |
| 8,247,776 B2 | 8/2012 | Peng |
| 8,275,091 B2 | 9/2012 | Morton |
| 8,288,718 B2 | 10/2012 | Li |
| 8,319,188 B2 | 11/2012 | Ramsden |
| 8,325,871 B2 | 12/2012 | Grodzins |
| 8,331,535 B2 | 12/2012 | Morton |
| 8,345,819 B2 | 1/2013 | Mastronardi |
| 8,356,937 B2 | 1/2013 | Kotowski |
| 8,374,310 B2 | 2/2013 | Kang |
| 8,374,993 B2 | 2/2013 | Ramsden |
| 8,384,016 B2 | 2/2013 | Ramsden |
| 8,385,501 B2 | 2/2013 | Allman |
| 8,389,942 B2 | 3/2013 | Morton |
| 8,396,189 B2 | 3/2013 | Kang |
| 8,428,217 B2 | 4/2013 | Peschmann |
| 8,433,036 B2 | 4/2013 | Morton |
| 8,437,448 B2 | 5/2013 | Langeveld |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,457,275 B2 | 6/2013 | Akery |
| 8,477,902 B2 | 7/2013 | Li |
| 8,483,356 B2 | 7/2013 | Bendahan |
| 8,491,189 B2 | 7/2013 | Kotowski |
| 8,503,605 B2 | 8/2013 | Morton |
| 8,503,606 B2 | 8/2013 | Rothschild |
| 8,532,823 B2 | 9/2013 | Mcelroy |
| 8,552,722 B2 | 10/2013 | Lionheart |
| 8,559,592 B2 | 10/2013 | Betcke |
| 8,579,506 B2 | 11/2013 | Morton |
| 8,582,857 B2 | 11/2013 | Chen |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,679,409 B2 | 3/2014 | Zhang |
| 8,687,765 B2 | 4/2014 | Kotowski |
| 8,690,427 B2 | 4/2014 | Mastronardi |
| 8,735,833 B2 | 5/2014 | Morton |
| 8,750,452 B2 | 6/2014 | Kaval |
| 8,774,357 B2 | 7/2014 | Morton |
| 8,781,067 B2 | 7/2014 | Langeveld |
| 8,798,232 B2 | 8/2014 | Bendahan |
| 8,804,899 B2 | 8/2014 | Morton |
| 8,824,632 B2 | 9/2014 | Mastronardi |
| 8,824,637 B2 | 9/2014 | Morton |
| 8,831,176 B2 | 9/2014 | Morton |
| 8,831,305 B2 | 9/2014 | Zhang |
| 8,837,669 B2 | 9/2014 | Morton |
| 8,837,670 B2 | 9/2014 | Akery |
| 8,840,303 B2 | 9/2014 | Morton |
| 8,842,808 B2 | 9/2014 | Rothschild |
| 8,859,981 B1 | 10/2014 | Stoian |
| 8,861,684 B2 | 10/2014 | Al-Kofahi |
| 8,885,794 B2 | 11/2014 | Morton |
| 8,908,831 B2 | 12/2014 | Bendahan |
| 8,913,707 B2 | 12/2014 | Kang |
| 8,929,509 B2 | 1/2015 | Morton |
| 8,958,526 B2 | 2/2015 | Morton |
| 8,971,485 B2 | 3/2015 | Morton |
| 8,971,487 B2 | 3/2015 | Mastronardi |
| 8,983,033 B2 | 3/2015 | Chen |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,096 B2 | 4/2015 | Allman |
| 9,020,103 B2 | 4/2015 | Grodzins |
| 9,025,731 B2 | 5/2015 | Kotowski |
| 9,036,779 B2 | 5/2015 | Morton |
| 9,037,342 B2 | 5/2015 | Shi |
| 9,042,511 B2 | 5/2015 | Peschmann |
| 9,046,465 B2 | 6/2015 | Thompson |
| 9,046,613 B2 | 6/2015 | Ramsden |
| 9,048,061 B2 | 6/2015 | Morton |
| 9,052,271 B2 | 6/2015 | Grodzins |
| 9,052,403 B2 | 6/2015 | Morton |
| 9,057,679 B2 | 6/2015 | Morton |
| 9,081,099 B2 | 7/2015 | Kang |
| 9,086,497 B2 | 7/2015 | Bendahan |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,121,958 B2 | 9/2015 | Morton |
| 9,128,200 B2 | 9/2015 | Muenster |
| 9,146,201 B2 | 9/2015 | Schubert |
| 9,158,027 B2 | 10/2015 | Morton |
| 9,158,030 B2 | 10/2015 | Morton |
| 9,182,515 B2 | 11/2015 | Stoian |
| 9,183,647 B2 | 11/2015 | Morton |
| 9,208,988 B2 | 12/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,257,208 B2 | 2/2016 | Rommel |
| 9,263,225 B2 | 2/2016 | Morton |
| 9,268,027 B2 | 2/2016 | Kang |
| 9,268,044 B2 | 2/2016 | Ramsden |
| 9,268,058 B2 | 2/2016 | Peschmann |
| 9,274,065 B2 | 3/2016 | Morton |
| 9,279,901 B2 | 3/2016 | Akery |
| 9,285,488 B2 | 3/2016 | Arodzero |
| 9,285,498 B2 | 3/2016 | Carver |
| 9,291,582 B2 | 3/2016 | Grodzins |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |

(56) References Cited

U.S. PATENT DOCUMENTS

| | | |
|---|---|---|
| 9,417,060 B1 | 8/2016 | Schubert |
| 9,420,677 B2 | 8/2016 | Morton |
| 9,442,082 B2 | 9/2016 | Morton |
| 9,465,119 B2 | 10/2016 | Manslow |
| 9,466,456 B2 | 10/2016 | Rommel |
| 9,535,019 B1 | 1/2017 | Rothschild |
| 9,535,177 B2 | 1/2017 | Ramsden |
| 9,541,510 B2 | 1/2017 | Arodzero |
| 9,568,637 B2 | 2/2017 | Stoian |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,658,343 B2 | 5/2017 | Arodzero |
| 9,675,306 B2 | 6/2017 | Morton |
| 9,688,517 B2 | 6/2017 | Morton |
| 9,714,920 B2 | 7/2017 | Lionheart |
| 9,720,111 B2 | 8/2017 | Ramsden |
| 9,726,619 B2 | 8/2017 | Thompson |
| 9,747,678 B2 | 8/2017 | Chen |
| 9,747,705 B2 | 8/2017 | Morton |
| 9,817,151 B2 | 11/2017 | Morton |
| 9,880,315 B2 | 1/2018 | Stoian |
| 9,958,569 B2 | 5/2018 | Morton |
| 10,007,019 B2 | 6/2018 | Morton |
| 10,032,021 B2 | 7/2018 | Pedersen |
| 10,107,783 B2 | 10/2018 | Lionheart |
| 10,126,442 B2 | 11/2018 | Ramsden |
| 10,175,381 B2 | 1/2019 | Morton |
| 10,228,487 B2 | 3/2019 | Mastronardi |
| 10,274,636 B2 | 4/2019 | Tang |
| 10,295,483 B2 | 5/2019 | Morton |
| 10,302,807 B2 | 5/2019 | Yu |
| 10,310,102 B2 | 6/2019 | Ramsden |
| 10,317,566 B2 | 6/2019 | Morton |
| 10,351,967 B2 | 7/2019 | Wang |
| 10,388,818 B2 | 8/2019 | Zhang |
| 10,408,967 B2 | 9/2019 | Morton |
| 10,429,523 B2 | 10/2019 | Ramsden |
| 10,473,795 B2 | 11/2019 | Wang |
| 10,483,077 B2 | 11/2019 | Morton |
| 10,585,207 B2 | 3/2020 | Morton |
| 10,586,324 B2 | 3/2020 | Zhao |
| 10,591,424 B2 | 3/2020 | Morton |
| 10,646,179 B2 | 5/2020 | Xu |
| 10,663,413 B2 | 5/2020 | Li |
| 10,663,616 B2 | 5/2020 | Morton |
| 10,677,943 B2 | 6/2020 | Moore |
| 10,739,491 B2 | 8/2020 | Yang |
| 10,775,320 B2 | 9/2020 | Li |
| 10,826,606 B1 | 11/2020 | Lundberg |
| 10,901,112 B2 | 1/2021 | Morton |
| 10,976,271 B2 | 4/2021 | Morton |
| 2002/0094064 A1 | 7/2002 | Zhou |
| 2003/0016790 A1 | 1/2003 | Grodzins |
| 2003/0035510 A1 | 2/2003 | Strommer |
| 2003/0043964 A1 | 3/2003 | Sorenson |
| 2003/0068557 A1 | 4/2003 | Kumashiro |
| 2004/0051265 A1 | 3/2004 | Nadeau |
| 2004/0120454 A1 | 6/2004 | Ellenbogen |
| 2004/0141584 A1 | 7/2004 | Bernardi |
| 2004/0252024 A1 | 12/2004 | Huey |
| 2004/0258198 A1 | 12/2004 | Carver |
| 2005/0023479 A1 | 2/2005 | Grodzins |
| 2005/0024199 A1 | 2/2005 | Huey |
| 2005/0100135 A1 | 5/2005 | Lowman |
| 2005/0117683 A1 | 6/2005 | Mishin |
| 2005/0123101 A1 | 6/2005 | Akutsu |
| 2005/0135668 A1 | 6/2005 | Polichar |
| 2005/0157842 A1 | 7/2005 | Agrawal |
| 2005/0169421 A1 | 8/2005 | Muenchau |
| 2005/0198226 A1 | 9/2005 | DeLia |
| 2006/0027751 A1 | 2/2006 | Kurita |
| 2006/0056584 A1 | 3/2006 | Allman |
| 2006/0114477 A1 | 6/2006 | Cox |
| 2006/0140341 A1 | 6/2006 | Carver |
| 2006/0182221 A1 | 8/2006 | Bernhardt |
| 2006/0249685 A1 | 11/2006 | Tanaka |
| 2006/0257005 A1 | 11/2006 | Bergeron |
| 2006/0284094 A1 | 12/2006 | Inbar |
| 2006/0290291 A1 | 12/2006 | Aizawa |
| 2007/0085010 A1 | 4/2007 | Letant |
| 2007/0092066 A1 | 4/2007 | Tkaczyk |
| 2007/0104320 A1 | 5/2007 | Arenson |
| 2007/0140423 A1 | 6/2007 | Foland |
| 2007/0147585 A1 | 6/2007 | Eilbert |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0211851 A1 | 9/2007 | Ogawa |
| 2007/0228284 A1 | 10/2007 | Polichar |
| 2007/0237293 A1 | 10/2007 | Singh |
| 2007/0269013 A1 | 11/2007 | Liu |
| 2007/0280502 A1 | 12/2007 | Paresi |
| 2008/0037707 A1 | 2/2008 | Rothschild |
| 2008/0048872 A1 | 2/2008 | Frank |
| 2008/0056608 A1 | 3/2008 | Spahn |
| 2008/0084963 A1 | 4/2008 | Clayton |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0211431 A1 | 9/2008 | Mishin |
| 2008/0230709 A1 | 9/2008 | Tkaczyk |
| 2008/0260097 A1 | 10/2008 | Anwar |
| 2008/0304622 A1 | 12/2008 | Morton |
| 2009/0001296 A1 | 1/2009 | Kuduvalli |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0168964 A1 | 7/2009 | Safai |
| 2009/0180590 A1* | 7/2009 | Borgmann ............... H05G 1/26 378/97 |
| 2009/0238336 A1 | 9/2009 | Akery |
| 2009/0245462 A1 | 10/2009 | Agrawal |
| 2009/0257555 A1 | 10/2009 | Chalmers |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0034355 A1 | 2/2010 | Langeveld |
| 2010/0161504 A1 | 6/2010 | Casey |
| 2010/0177868 A1 | 7/2010 | Smith |
| 2010/0177873 A1 | 7/2010 | Chen |
| 2010/0295689 A1 | 11/2010 | Armistead, Jr. |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0204243 A1 | 8/2011 | Bendahan |
| 2011/0235777 A1 | 9/2011 | Gozani |
| 2011/0266643 A1 | 11/2011 | Engelmann |
| 2012/0099710 A1 | 4/2012 | Kotowski |
| 2012/0104276 A1 | 5/2012 | Miller |
| 2012/0116720 A1 | 5/2012 | Klann |
| 2012/0273665 A1* | 11/2012 | Schulte ............... G01N 23/046 250/252.1 |
| 2013/0001048 A1 | 1/2013 | Panesar |
| 2013/0129043 A1 | 5/2013 | Morton |
| 2014/0029727 A1 | 1/2014 | Ono |
| 2014/0185771 A1 | 7/2014 | Morton |
| 2014/0197321 A1 | 7/2014 | Bendahan |
| 2014/0353514 A1* | 12/2014 | Unfors ............... G01T 1/026 250/370.07 |
| 2015/0036798 A1 | 2/2015 | Morton |
| 2015/0078519 A1 | 3/2015 | Morton |
| 2015/0300220 A1 | 10/2015 | Morton |
| 2015/0355117 A1 | 12/2015 | Morton |
| 2015/0355369 A1 | 12/2015 | Morton |
| 2016/0025889 A1 | 1/2016 | Morton |
| 2016/0033674 A1 | 2/2016 | Allman |

(56) References Cited

U.S. PATENT DOCUMENTS

| | | |
|---|---|---|
| 2020/0060750 A1 | 2/2020 | Kaveckis |
| 2020/0230436 A1* | 7/2020 | Liu .................. G21K 1/02 |
| 2022/0390391 A1* | 12/2022 | Bendahan ............ G01N 23/05 |

FOREIGN PATENT DOCUMENTS

| | | |
|---|---|---|
| AU | 2008267661 B2 | 4/2011 |
| AU | 2008267660 B2 | 6/2011 |
| AU | 2014299147 B2 | 10/2016 |
| CA | 2481596 C | 11/2009 |
| EP | 0077018 A1 | 4/1983 |
| EP | 0146992 A1 | 7/1985 |
| EP | 0417965 A2 | 3/1991 |
| EP | 0919186 A2 | 6/1999 |
| EP | 1413898 A1 | 4/2004 |
| EP | 1642529 A1 | 4/2006 |
| EP | 1328827 B1 | 8/2008 |
| EP | 2102636 B1 | 4/2012 |
| EP | 2019974 B1 | 8/2013 |
| EP | 2593813 B1 | 4/2014 |
| EP | 2075595 B1 | 4/2015 |
| EP | 2047293 B1 | 5/2015 |
| EP | 2705386 B1 | 9/2015 |
| EP | 2113791 B1 | 8/2016 |
| EP | 2883085 B1 | 8/2018 |
| EP | 1749220 B1 | 10/2019 |
| EP | 2287636 B1 | 10/2019 |
| EP | 3077852 B1 | 12/2019 |
| EP | 2778716 B1 | 4/2020 |
| EP | 3474292 B1 | 9/2020 |
| EP | 3505975 B1 | 1/2021 |
| GB | 2255634 A | 11/1992 |
| GB | 2409268 A | 6/2005 |
| GB | 2401766 B | 3/2006 |
| GB | 2424065 A | 9/2006 |
| GB | 2418015 B | 12/2006 |
| GB | 2438317 A | 11/2007 |
| GB | 2445578 B | 1/2009 |
| GB | 2440588 B | 9/2009 |
| GB | 2432094 B | 4/2010 |
| GB | 2463254 B | 7/2010 |
| GB | 2437979 B | 12/2010 |
| GB | 2463707 B | 6/2011 |
| GB | 2472420 B | 2/2012 |
| GB | 2455906 B | 6/2012 |
| GB | 2490513 B | 11/2015 |
| GB | 2499391 B | 11/2015 |
| GB | 2504771 B | 2/2016 |
| GB | 2522017 B | 9/2017 |
| GB | 2520762 B | 4/2018 |
| GB | 2525826 B | 9/2020 |
| GB | 2555564 B | 9/2020 |
| GB | 2560552 B | 9/2020 |
| GB | 2577909 B | 11/2020 |
| GB | 2552538 B | 12/2020 |
| JP | 2000262512 | 9/2000 |
| JP | 2002014059 | 1/2002 |
| JP | 2005124975 | 5/2005 |
| JP | 2005149762 | 6/2005 |
| JP | 2007093501 | 4/2007 |
| WO | 1998055851 A1 | 12/1998 |
| WO | 0033060 A2 | 6/2000 |
| WO | 0159485 A1 | 8/2001 |
| WO | 2001059485 | 8/2001 |
| WO | 2001079798 A2 | 10/2001 |
| WO | 2004010127 A1 | 1/2004 |
| WO | 2005098400 | 10/2005 |
| WO | 2006000020 A1 | 1/2006 |
| WO | 2006036076 A1 | 4/2006 |
| WO | 2006053279 A2 | 5/2006 |
| WO | 2006078691 A2 | 7/2006 |
| WO | 2007035359 A2 | 3/2007 |
| WO | 2007055720 A2 | 5/2007 |
| WO | 2007068933 A1 | 6/2007 |
| WO | 2007103216 A2 | 9/2007 |
| WO | 2008017983 | 2/2008 |
| WO | 2009000020 A1 | 12/2008 |
| WO | 2009027667 A2 | 3/2009 |
| WO | 2009106803 A2 | 9/2009 |
| WO | 2009137698 | 11/2009 |
| WO | 2009143169 A1 | 11/2009 |
| WO | 2010019311 | 2/2010 |
| WO | 2011069024 A1 | 6/2011 |
| WO | 2011091070 A2 | 7/2011 |
| WO | 2011095810 A2 | 8/2011 |
| WO | 2011095942 A2 | 8/2011 |
| WO | 2013116549 A1 | 8/2013 |
| WO | 2013119423 A1 | 8/2013 |
| WO | 2014107675 | 7/2014 |
| WO | 2014121097 A1 | 8/2014 |
| WO | 2014124152 A2 | 8/2014 |
| WO | 2016011205 | 1/2016 |
| WO | 2021050535 A1 | 3/2021 |

OTHER PUBLICATIONS

International Search Report for PCT/GB2011/050182, Dec. 28, 2011.
International Search Report for PCT/US09/47292, mailed on Apr. 23, 2012, Rapiscan Laboratories, Inc.
SORMA West 2008 "Intensity Modulated Advanced X-Ray Source (IMAXS) for Homeland Security Applications", p. 74, [online], last updated: May 22, 2008. URL:http://www2.lbl.gov/conferences/SORMA/assets/doc/SORMAOralProgram30May.pdf.
Willem Gerhardus Johannes Langeveld et al: 'Intensity-Modulated Advanced X-Ray Source (IMAXS) for Homeland Security Applications', IEEE Transactions on Nuclear Science, IEEE Service Center, New York, NY, US, vol. 56, No. 3, Jun. 1, 2009 (Jun. 1, 2009), pp. 1288-1291, XP011262712, ISSN: 0018-9499.
Langeveld et al.: "Intensity-modulated Advanced X-ray Source (IMAXS) for Homeland Security Applications", IEEE Transactions on Nuclear Science, vol. 56, No. 3, Jun. 2009.
International Search Report for PCT/IB2011/050469, Jun. 9, 2011.
International Search Report for PCT/US23/60612, Jul. 11, 2023.
CRS Report for Congress, Aviation Security Technologies and Procedures: Screening Passengers and Baggage, Oct. 26, 2001, pp. 1-12.
International Search Report for PCT/US2015/040653, Dec. 16, 2015.
International Search Report for PCT/US14/56652, Apr. 27, 2015.
International Search Report for PCT/US14/14198, May 16, 2014.
International Preliminary Report on Patentability for PCT/US2014/014198, Aug. 4, 2015.
International Search Report for PCT/US11/21758; Jul. 7, 2011, Rapiscan Systems Inc.
International Preliminary Report on Patentability for PCT/US11/21758, Jul. 7, 2011.
Written Opinion on Patentability for PCT/US11/21758; Jul. 7, 2011; Rapiscan Systems.
Molchanov P A et al: 'Nanosecond gated optical sensors for ocean optic applications' Sensors Applications Symposium, 2006. Proceedings of The 2006 IEEE Houston, Texas, USA Feb. 7-9, 2006, Piscataway, NJ, USA, IEEE, Feb. 7, 2006 (Feb. 7, 2006) , pp. 147-150, XP010917671 ISBN: 978-0-7803-9580-0.
"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20> [retrieved on Jan. 6, 2010].
International Search Report for PCT/GB09/00575, Apr. 7, 2010.
International Search Report for PCT/GB2009/000497, Jan. 22, 2010.
Smith C. R. et al: 'Application of 450 kV computed tomography to engine blocks with steel liners' Materials Evaluation vol. 65, No. 5, 2007, pp. 458-461, XP055108238.
International Search Report for PCT/US13/23676, Jun. 28, 2013.
International Search Report for PCT/US13/24191, Rapiscan Systems Inc., mailed on Jun. 25, 2013.
International Search Report for PCT/US2014/010370, May 13, 2014.

(56) References Cited

OTHER PUBLICATIONS

International Search Report for PCT/US10/58809; Rapiscan Systems Inc .; Apr. 19, 2011.
International Search Report for PCT/US2014/015126, May 27, 2014.
Written Opinion of the International Searching Authority for PCT/US2014/015126, May 27, 2014.
International Search Report for PCT/US2012/054110, Dec. 24, 2012.

* cited by examiner

HVL & End Point Energy

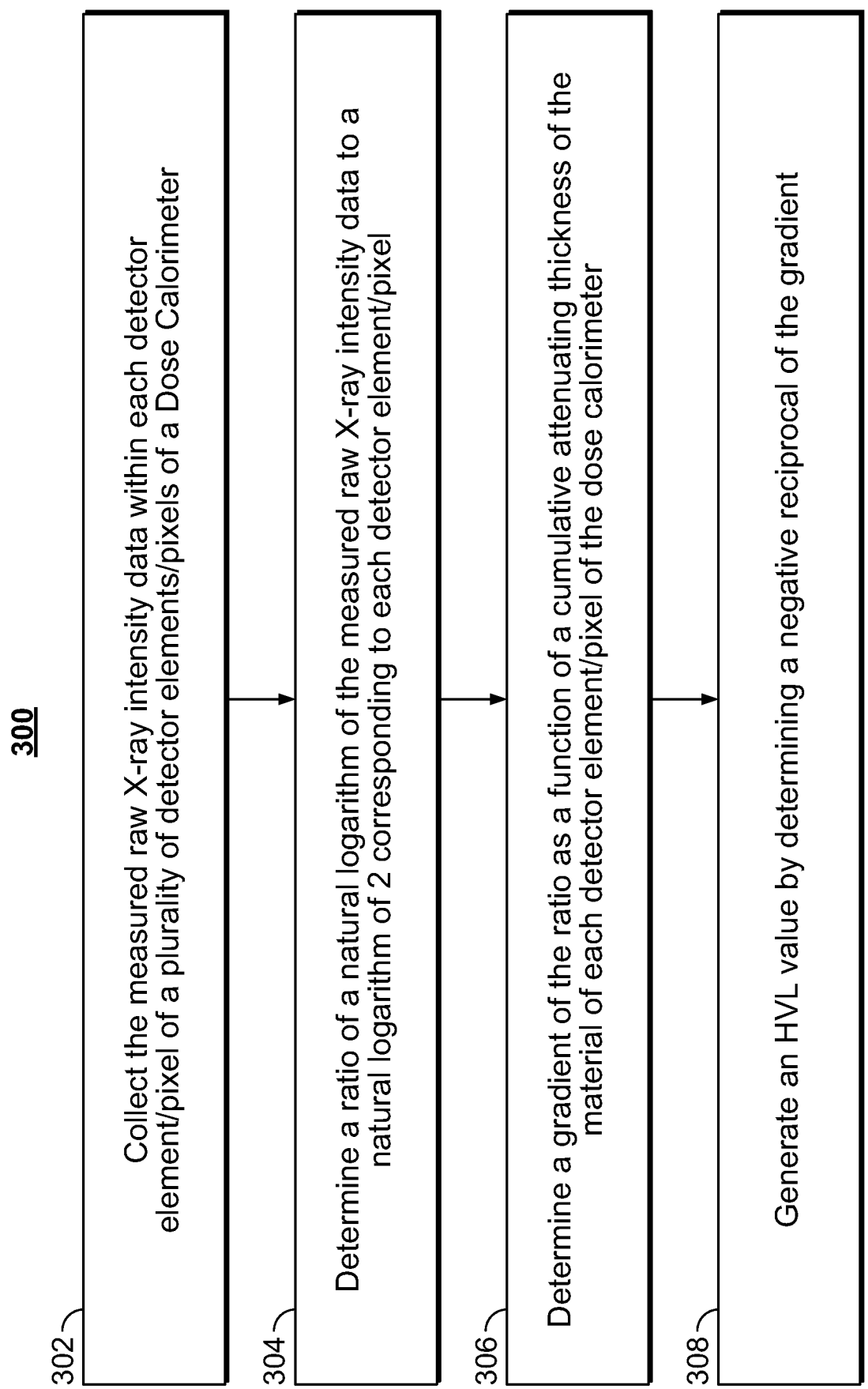

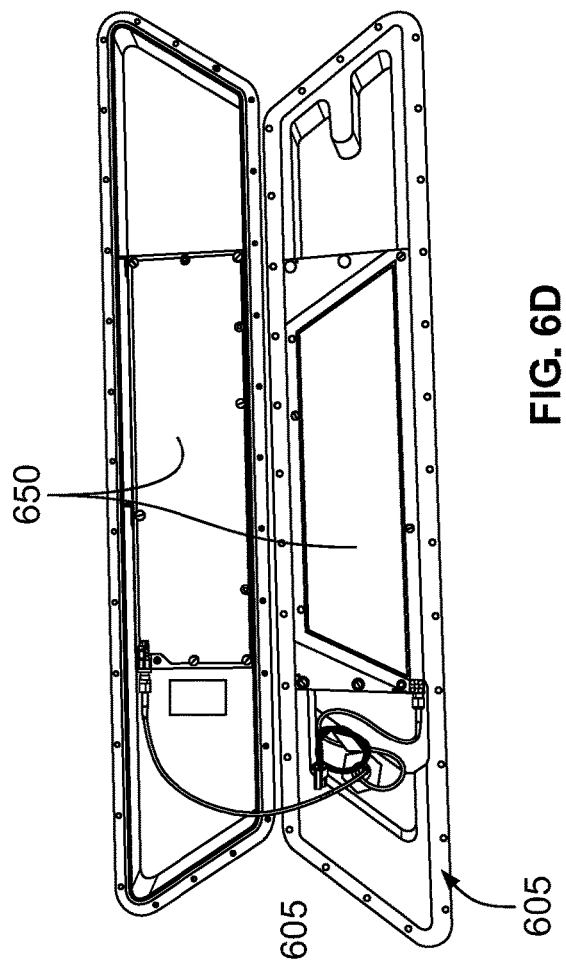
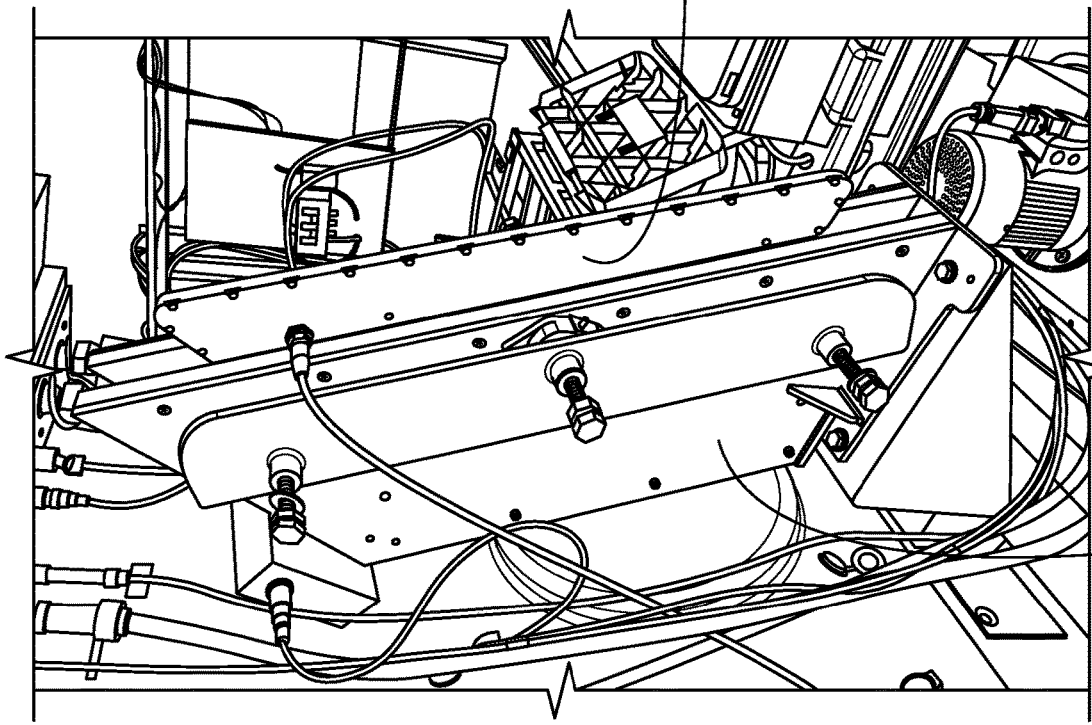

SYSTEMS AND METHODS FOR REAL-TIME ENERGY AND DOSE MONITORING OF AN X-RAY LINEAR ACCELERATOR

CROSS-REFERENCE

The present application relies on U.S. Patent Provisional Application No. 63/267,526, titled "Systems and Methods for Real-Time Energy and Dose Monitoring of an X-Ray Linear Accelerator" and filed on Feb. 3, 2022, for priority, which is herein incorporated by reference in its entirety.

FIELD

The present specification is related generally to the field of evaluating and monitoring a radiation source system. More specifically, the present specification is related to measurement of X-ray radiation dose output and energy of an X-ray linear accelerator in order to a) correct a scan image, b) correct an output of the linear accelerator to achieve stable and constant output, and c) monitor the dose footprint.

BACKGROUND

X-ray scanners such as those for cargo inspection typically comprise a switchable multi-energy X-ray source such as a linear accelerator (linac). Radiation generated from the linac is typically collimated to generate a narrow-shaped beam of radiation which is swept relative to the cargo under inspection while portions of the beam that are either transmitted through the cargo or scattered by it are detected. To ensure safe and consistent scanning, it is necessary to control radiation parameters in X-ray imaging, including for industrial applications such as cargo inspection, radiography, and food sterilization and for medical applications such as radiation imaging and therapy.

X-ray scanner performance is determined by measuring radiation. If a scanner is found to be non-compliant with expected performance parameters, corrective action is taken, such as recalibration of the equipment. Radiation based performance parameters include kVp (kilovolts peak), mA (milliamperes), HVL (half value layer), radiation dose output, exposure time, and radiation waveform.

The spectral distribution of generated X-rays is characterized by the number (intensity) of X-ray photons at a given energy (wavelength/frequency), wherein both values, when combined, affect the overall dose of any X-ray pulse. For X-ray pulses with a continual distribution of energies up to a configured maximum value, a measure of the maximum "end-point" energy can be determined from inspection of the Half-Value Layer (HVL). The HVL is usually obtained taking data in several discrete exposures of radiation output placing different thicknesses of filters, typically steel, in the path of radiation.

As environmental and operational conditions vary across the course of a scan, several scans, a day, week or even year, the output of the X-ray source varies in both the maximum energy output as well as the distribution of energies within the spectrum, and therefore the dose.

Accordingly, there is a need for systems and methods to consistently measure, in real-time, the end-point energy of a linac and determine an HVL value from an X-ray radiation dose output of the linac per pulse. There is also a need to use the determined changing HVL and dose values in order to correct for energy drift and to adjust a scan image due to pulse-to-pulse changes in linac dose output for providing better material identification consistency across a scan.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a linear accelerator comprising: a magnetron; a target; an electron gun, wherein the electron gun is configured to direct an accelerated beam of electrons at the target, thereby generating a beam of X-rays; a primary collimator positioned along a direction of the beam of X-rays; a secondary collimator positioned to receive the beam of X-rays exiting the primary collimator; an attenuating element positioned proximate the primary collimator; a calorimeter positioned proximate the primary collimator; and a reference detector positioned proximate the secondary collimator and configured to generate data indicative of an X-ray radiation dose output on a pulse-by-pulse basis.

Optionally, the target is positioned between the electron gun and the primary collimator.

Optionally, the secondary collimator is coupled to an end of the primary collimator.

Optionally, the attenuating element and the calorimeter are positioned within the primary collimator.

Optionally, the reference detector is positioned within the secondary collimator.

Optionally, at least one of the primary collimator or secondary collimator has a fixed beam-shaping aperture.

Optionally, at least one of the primary collimator or secondary collimator has a variable beam-shaping aperture.

Optionally, the attenuating element is configured to shift data corresponding to a half value layer (HVL) measurement into a region that is less influenced by low-energy components of the beam of X-rays.

Optionally, the attenuating element is configured to shift data corresponding to a half value layer (HVL) measurement into a region based on an end-point energy of the linear accelerator.

Optionally, the beam of electrons is alternately accelerated to at least a first peak energy of approximately 6 MeV and to a second peak energy of approximately 4 MeV.

Optionally, the reference detector is further configured to generate a half value layer (HVL) value on said pulse-by-pulse basis. Optionally, the calorimeter comprises a first detector element and at least one subsequent detector element, thereby forming a stacked array of detector elements. Optionally, the linear accelerator further comprises a computing device in data communication with the linear accelerator and a programmable logic in data communication with the computing device, wherein the computing device is configured to measure said HVL value by: acquiring X-ray intensity data from the detector elements; determining a ratio of a natural logarithm of the X-ray intensity data to a natural logarithm of 2 corresponding to each of the detector elements; determining a gradient of the ratio as a function of a cumulative attenuating thickness of material comprising each of the detector elements; and generating the HVL value by determining a negative reciprocal of the gradient.

Optionally, the linear accelerator further comprises a computing device in data communication with the linear accelerator and a programmable logic in data communication with the computing device, wherein the computing device is configured to: determine a relationship between material separation curves of at least first and second materials in a scanned object formed by modifying high and low peak energies of pulses of said beam of X-rays and corresponding HVL value measurements for each of said pulses; and use a calibration curve, based on said HVL value measurements for each of said pulses, to colorize a scan image for material identification.

Optionally, the linear accelerator further comprises a computing device in data communication with the linear accelerator and a programmable logic in data communication with the computing device, wherein the computing device is configured to use said X-ray radiation dose output to correct a scan image due to pulse-to-pulse variations in the X-ray radiation dose output by calculating a reference correction factor for a pulse at a given point in time and applying said reference correction factor to a raw image signal value to generate a normalization pixel value.

Optionally, the linear accelerator further comprises a computing device in data communication with the linear accelerator and a programmable logic in data communication with the computing device, wherein the computing device is configured to use the X-ray radiation dose output for normalizing scan image data by acquiring a reference correction factor from the reference detector and dividing said reference correction factor by an average light signal per pixel to calculate a ratio that is independent of the X-ray radiation dose output.

Optionally, the linear accelerator further comprises a computing device in data communication with the linear accelerator and a programmable logic in data communication with the computing device, wherein said programmable logic controller and/or said computing device stores at least one predefined threshold X-ray radiation dose value, and wherein said programmable logic controller is configured to deactivate said linear accelerator if said the X-ray radiation dose output approaches or exceeds said at least one predefined threshold X-ray radiation dose value.

The present specification also discloses a method of using measured real-time half value layer (HVL) data to correct for energy drift of a linear accelerator, wherein the linear accelerator is in data communication with a computing device and a programmable logic controller and wherein the linear accelerator comprises at least a magnetron, an electron gun, and at least one of an array of detectors or a calorimeter, the method comprising: adjusting a pulse width of the electron gun if the measured HVL data changes while a dose measured by a first detector element of the array of detectors or the calorimeter does not change; measuring a power output of the magnetron and providing the measured power to the programmable logic controller for continued real time HVL data measurement when the measured HVL data changes and the dose measured by the first detector element of the array of detectors or the calorimeter also changes; adjusting a current pulse to the magnetron if a change in said measured HVL data is due to a change in a measured forward radiofrequency (RF) power; and adjusting a frequency output of the magnetron if the change in said measured HVL data is not due to the change in the measured forward RF power.

Optionally, the method further comprises measuring the power output of the magnetron using a directional coupler.

Optionally, the method further comprises increasing the pulse width when the measured HVL data increases and decreasing the pulse width when the measured HVL data decreases.

Optionally, the method further comprises increasing the current pulse when a decrease in the measured HVL data corresponds to a decrease in the forward RF power and decreasing the current pulse when an increase in the measured HVL data value corresponds to an increase in the forward RF power.

Optionally, the method further comprises adjusting the frequency output using a motor connected to a tuning stub of the magnetron. Optionally, the method further comprises moving the tuning stub in a first direction when the measured HVL data approaches closer to an original value as a result of said movement of said tuning stub in said first direction and moving the tuning stub in a second direction opposite to said first direction when the measured HVL data moves away from the original value as a result of the movement of the tuning stub in the first direction.

The present specification also discloses a linear accelerator comprising: a target; an electron gun, wherein the electron gun is configured to direct an accelerated beam of electrons at the target thereby generating a beam of X-rays; a primary collimator positioned beyond the target along a direction of the beam of X-rays; a secondary collimator coupled to an end of the primary collimator where the beam of X-rays exit the primary collimator; an attenuating element positioned within the primary collimator and configured to shift an acquisition of X-ray data into a region less influenced by low-energy components of the beam of X-rays and into a region more related to an end-point energy of the linear accelerator; and a detector positioned within the secondary collimator and configured to measure an X-ray radiation dose output of the linear accelerator on a pulse-by-pulse basis, wherein said detector is enclosed within a housing defined by two parallel copper plates at a predefined fixed distance.

Optionally, said secondary collimator comprises a cover plate, a top support, first and second side plates, a first set of collimating jaws, collimator adjustment assembly and a second set of collimating jaws.

Optionally, the linear accelerator further comprises a dehumidifier positioned within the housing.

Optionally, the attenuating element comprises approximately 6 inches of steel.

The present specification also discloses a linear accelerator, wherein the linear accelerator is in data communication with a computing device and a programmable logic controller and wherein the linear accelerator comprises: a magnetron; an electron gun, wherein the electron gun is configured to direct an accelerated beam of electrons at a target thereby generating a beam of X-rays; a primary collimator positioned beyond the target along a direction of the beam of X-rays; a secondary collimator coupled to an end of the primary collimator at which the beam of X-rays exit the primary collimator; an attenuating element and a calorimeter positioned within the primary collimator; and a reference detector positioned within the secondary collimator and configured to generate data indicative of an X-ray radiation dose output and a half value layer (HVL) value of the linear accelerator on a pulse-by-pulse basis.

Optionally, at least one of the primary collimator or secondary collimator has a fixed beam-shaping aperture.

Optionally, at least one of the primary collimator or secondary collimator has a variable beam-shaping aperture.

Optionally, the calorimeter includes a first detector element/pixel and at least one subsequent detector element/pixels, forming a stacked, segmented array of a plurality of detector elements.

Optionally, the attenuating element is configured to shift an acquisition of data corresponding to the HVL measurement into a region less influenced by low-energy components of the beam of X-rays and into a region more related to an end-point energy of the linear accelerator.

Optionally, the beam of electrons is alternately accelerated to at least a first peak energy and to a second peak energy, wherein the first peak energy is approximately 6 MeV and the second peak energy is approximately 4 MeV.

Optionally, the computing device is configured to measure said HVL value by: acquiring X-ray intensity data within each detector element of the plurality of detector elements; determining a ratio of a natural logarithm of the X-ray intensity data to a natural logarithm of 2 corresponding to each detector element; determining a gradient of the ratio as a function of a cumulative attenuating thickness of the material of each detector element; and generating the HVL value by determining a negative reciprocal of the gradient.

Optionally, the computing device is configured to: determine a relationship between material separation curves of at least first and second materials in a scanned object, change affected by changing high and low peak energies of pulses of said beam of X-rays and corresponding HVL value measurement for each of said pulses; and use a calibration curve, based on said HVL value measurement for each of said pulses, to colorize a scan image for material identification.

Optionally, the computing device is configured to use said measured X-ray radiation dose output to correct a scan image due to pulse-to-pulse variations in X-ray radiation dose output by: calculating a reference correction factor for a pulse at a given point in time; and applying said reference correction factor to a raw image signal value to generate a second pass normalization pixel value.

Optionally, the computing device is configured to use said measured X-ray radiation dose output for normalizing scan image data by: acquiring a reference correction factor from the reference detector; and dividing said reference correction factor by an average light signal per pixel on the reference detector to calculate a ratio that is independent of said X-ray radiation dose output.

Optionally, said programmable logic controller and/or said computing device stores at least one predefined threshold X-ray radiation dose value, wherein said programmable logic controller is configured to disarm said linear accelerator if said measured X-ray radiation dose output approaches or exceeds said at least one predefined threshold X-ray radiation dose value.

The present specification also discloses a method of using measured real-time HVL data to correct for energy drift of a linear accelerator, said linear accelerator being in data communication with a computing device and a programmable logic controller, wherein said linear accelerator comprises at least a magnetron and an electron gun, the method comprising: adjusting a pulse width of the electron gun if said measured HVL data changes but a dose measured by a first detector element, pixel or crystal of a stacked segmented array of detectors or calorimeter does not change; measuring a power output of the magnetron using a directional coupler and feeding said measured power into the programmable logic controller for continued real time HVL data measurement, if said measured HVL data changes and the dose measured by the first detector element, pixel or crystal of a stacked segmented array of detectors or calorimeter also changes; adjusting a current pulse to the magnetron if a change in said measured HVL data is due to a change in a measured forward RF power; and adjusting a frequency output of the magnetron if the change in said measured HVL data is not due to the change in the measured forward RF power.

Optionally, said pulse width is increased if said measured HVL data increases and said pulse width is decreased if said measured HVL data decreases.

Optionally, said current pulse is increased if a decrease in the measured HVL data corresponds to a decrease in the forward RF power, wherein said current pulse is decreased if an increase in the measured HVL data value corresponds to an increase in the forward RF power.

Optionally, said frequency output is adjusted using a motor connected to a tuning stub of the magnetron. Optionally, the tuning stub is continued to be moved in a first direction if the measured HVL data approaches closer to an original value as a result of said movement of said tuning stub in said first direction, wherein the tuning stub is moved in a second direction opposite to said first direction if the measured HVL data moves away from the original value as a result of said movement of said tuning stub in said first direction.

The present specification also discloses a linear accelerator comprising: an electron gun, wherein the electron gun is configured to direct an accelerated beam of electrons at a target thereby generating a beam of X-rays; a primary collimator positioned beyond the target in a direction of the beam of X-rays; a secondary collimator coupled to an end of the primary collimator at which the beam of X-rays exit the primary collimator; an attenuating element positioned within the primary collimator and configured to shift an acquisition of X-ray data into a region less influenced by low-energy components of the beam of X-rays and into a region more related to an end-point energy of the linear accelerator; and a detector positioned within the secondary collimator and configured to measure an X-ray radiation dose output of the linear accelerator on a pulse-by-pulse basis, wherein said detector is enclosed within a housing that holds two parallel copper plates at a predefined fixed distance.

Optionally, said secondary collimator comprises a cover plate, a top support, first and second side plates, a first set of collimating jaws, collimator adjustment assembly and a second set of collimating jaws.

Optionally, said housing includes a dehumidifier.

Optionally, the attenuating element comprises 6 inches of steel.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3 is a flowchart of a plurality of exemplary steps of a method of determining an HVL measurement, in accordance with some embodiments of the present specification;

FIG. 6C shows the reference detector housing pulled out of the secondary collimator assembly, in accordance with some embodiments of the present specification;

FIG. 6D shows first and second copper plates of an ion chamber of a reference detector, in accordance with some embodiments of the present specification;

DETAILED DESCRIPTION

Figure 1:
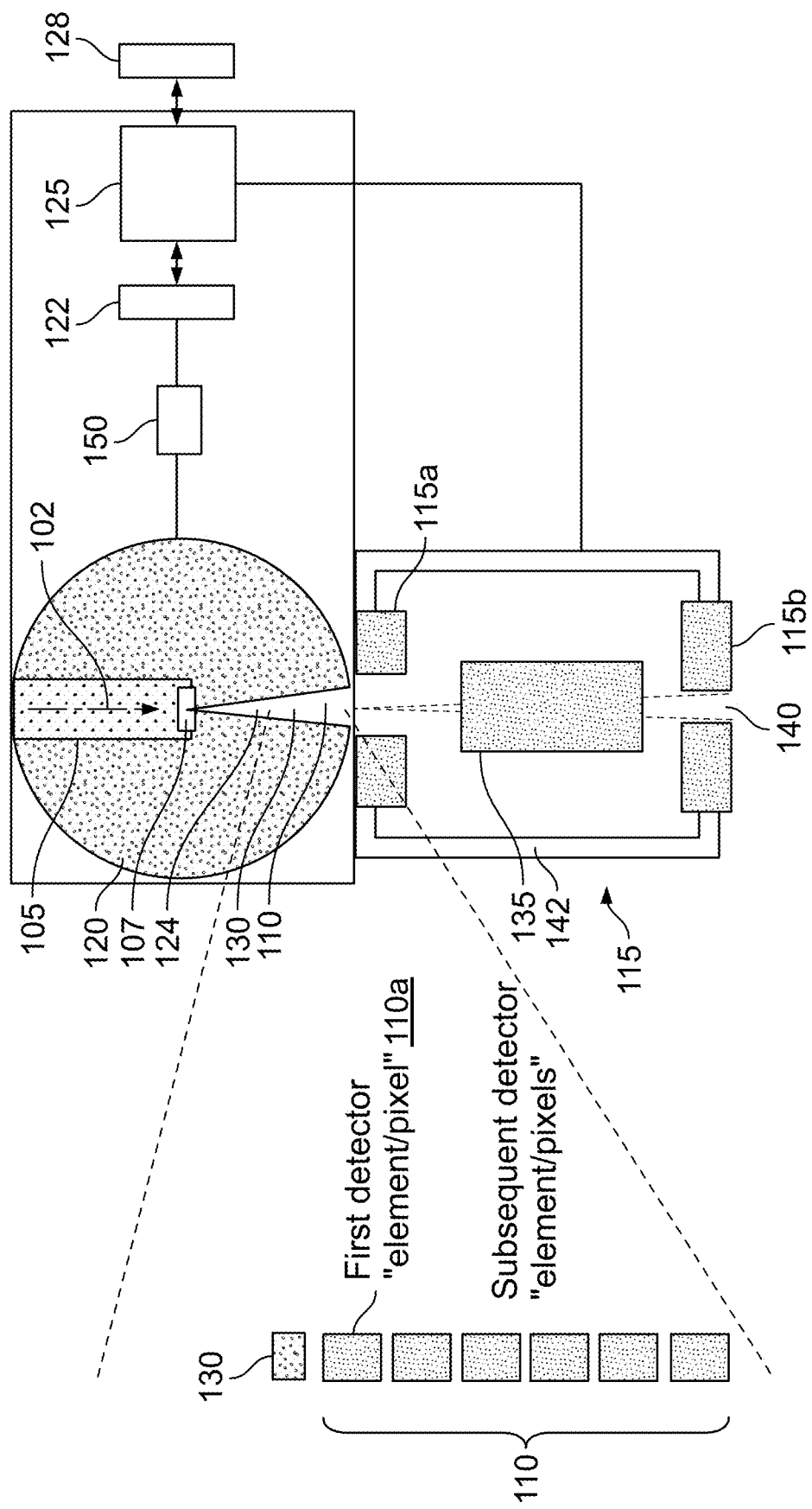
FIG. 1 illustrates an X-ray system in accordance with some embodiments of the present specification.

The present specification is directed towards systems and methods for enabling real-time pulse-to-pulse analyses of multiple features of the X-ray pulse from a high-energy source (such as, a linac). The analyses provide, in embodiments, the total dose, the maximum dose (peak), the dose distribution (Full Width at Half Maximum), rise time and fall time; an energy of the output from a measure of HVL value; a measure of the dose distribution across the full emission spectrum; a measure of the energy distribution across the full emission spectrum from multiple HVL measurements; and/or a potential that the measurement is determined within the time taken to generate the next pulse from the linac so that it can inform the output characteristics of the next pulse.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The term "half-value layer (HVL)", used in the present specification, is a measure of the quality or intensity of an X-ray beam. The HVL of an X-ray beam is defined as an amount of absorbing material that is needed to reduce the beam to half of its original potential. HVL is an indirect measure of photon energy or beam hardness. A lower HVL indicates low photon energy. HVL is typically measured in millimeters of steel. After filtration by one HVL, the subsequent HVL will be higher as the filtered photons have higher energy (thicker material is required to attenuate half of the penetrating beams).

In various embodiments, a computing device may be employed to receive and process data signals and image data and may include an input/output controller, at least one communication interface and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform various functions and processes such as, for example, performing tomographic image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

X-Ray System

FIG. 1 illustrates an X-ray system 100, in accordance with some embodiments of the present specification. The X-ray system 100 comprises an X-ray source 105 that, in some embodiments, is a switchable multi-energy linear accelerator (linac). A control interface 128 enables an operator to adjust settings and operation of the linac 105. In some embodiments, the control interface 128 is in data communication with a programmable logic controller (PLC) 122 and a computing device 125 to provide control signals to the linac 105 such as for dose modulation.

In some embodiments, a controller 150 interfaces with at least a magnetron and an electron gun of the linac 105. The controller 150 is configured to receive control signals from the PLC 122 and/or the computing device 125. A modulator or pulsed power supply is connected to the electron gun which, in operation, is configured to fire a beam of electrons 102 into the linac 105. In some embodiments, the modulator or pulsed power supply causes the electron gun to fire the beam of electrons 102 with desired temporal characteristics such as, but not limited to, frequency (that is, a pulse repetition rate) and duty cycle. The accelerated beam of electrons 102 is directed at a target 107, such as that of tungsten, thereby generating a beam of X-rays 140.

The beam of electrons 102 can be accelerated at different energies, using, for example but not limited to, a beam loading effect or changing RF power input, before the electrons strike the target 107. In some embodiments, in an interleaving operation, the beam of electrons 102 is alternately accelerated to at least two different output peak energies such as, for example, to a first peak energy (low energy) of about 4 MeV and a second peak energy (high energy) of about 6 MeV.

The X-ray radiation beam 140 generated by the linac 105 is shaped by one or more beam shaping components or radiation delivery devices. In some embodiments, the one or more beam shaping components comprise a primary collimator assembly 120 (that is internal to the linac 105) and a secondary collimator assembly 115. In some embodiments, the secondary collimator assembly 115 comprises a first set of collimating jaws 115a and a second set of collimating jaws 115b. The first set of collimating jaws 115a are fixed to a gap having a dimension in a range of 3 mm to 20 mm, preferably about 10 mm. The second set of collimating jaws 115b are adjustable all the way to being fully closed. In some embodiments, a structure 142 holds the first and second sets of jaws 115a, 115b together and also functions as a shield. In alternate embodiments, the one or more beam shaping components may further include a multi-leaf collimator, a first set of jaws, and/or a second set of jaws.

In some embodiments, the primary collimator 120 and/or the secondary collimator 115 may comprise a fixed beam-shaping aperture 124 (that is, a shape and/or size of the aperture 124 may be constrained to a predetermined shape or size) or a variable beam-shaping aperture 124 (that is, a shape and/or size of the aperture 124 may be varied as desired).

In some embodiments, the primary collimator 120 is positioned after the electron beam 102 has passed through the target 107 of the linac 105. In some embodiments, the secondary collimator 115 is positioned after the primary collimator 120 (in the direction of the beam of X-rays 140).

In accordance with some aspects of the present specification, an attenuating element 130 and a calorimeter 110 are positioned within the primary collimator 120. In some configurations, a reference detector 135 is positioned within the secondary collimator 115. In some embodiments, the attenuating element 130 comprises 6 inches of steel or equivalent. In embodiments, the attenuating element 130 is used for measuring the end-point energy per pulse of the linac 105 and determining HVL value from the X-ray radiation dose output captured per pulse. In embodiments, the reference detector 135 is configured to measure an X-ray radiation dose output of the linac 105.

Figure 2A:
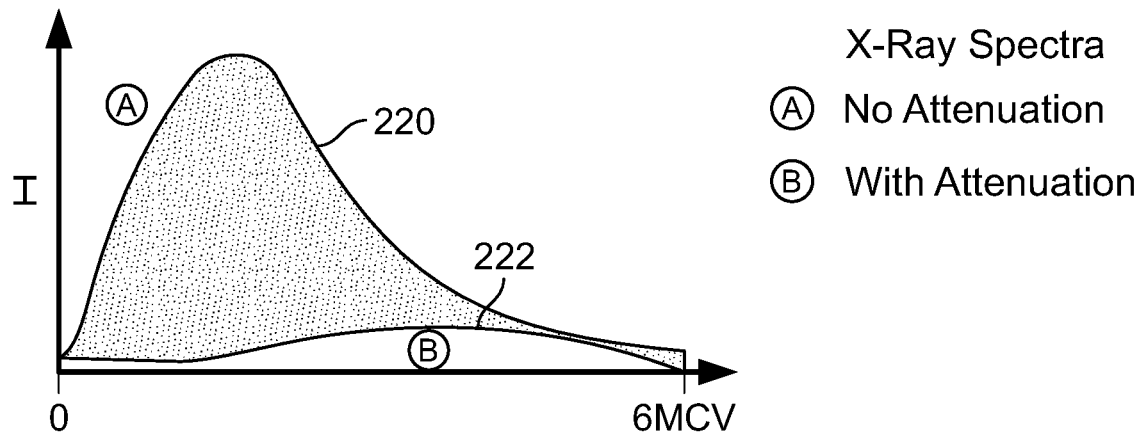
FIG. 2A shows a first X-ray spectra output from a linac with no attenuation and a second X-ray spectra output with attenuation, in accordance with embodiments of the present specification.

FIG. 2A shows a first X-ray spectrum 220 output from a linac with no attenuation (without attenuating element 130) and a second X-ray spectrum 222 output with attenuation (using attenuating element 130). The figure illustrates how the distribution of energies changes with attenuation. Thus, when trying to identify the end point energy of the pulse, a more accurate value is realized once enough of the low-energy X-rays in the pulse are attenuated away (and therefore the need for the attenuating element 130). For low attenuation, the peak in the first curve 220, which is at much lower energies, can yield a lower HVL value. Once a certain thickness of attenuating material (such as, for example, 6 inches of steel for the attenuating element 130) is surpassed, then the second curve 222 is realized which provides a better indication through the HVL of the end point (maximum) energy.

In accordance with some aspects of the present specification, the primary collimator 120 of the linac 105 is employed to a) shield and/or b) attenuate the X-ray radiation beam 140 emanating from the target 107 to a desired intensity or at least one desired energy level for measuring HVL data. In some embodiments, the calorimeter 110 is a stacked segmented array or module. The stacked array 110 illustrates a first detector element/pixel 110a followed by a plurality of subsequent detector elements/pixels of the stacked array configuration. In various embodiments, the calorimeter 110 may include 8, 16, or 24 individual detector elements/pixels in the beam direction, wherein each detector element/pixel samples successively less of the signal as it is attenuated by preceding crystals. In embodiments, each detector element/pixel has a predefined thickness 't' in the direction of the X-ray beam 140 path. In some embodiments, the predefined thickness 't' ranges from 2.5 mm to 20 mm (and would depend on the type of material of the detector elements/pixels).

In embodiments, the types of materials, for shielding 142 and the attenuating element 130, are typically dense, with high-attenuating properties, and include materials such as steel, lead or tungsten, to reduce the volume needed to shield and sufficiently attenuate. In some embodiments, the attenuating element 130 uses 6 inches of pre-attenuating steel, corresponding to approximately 3 inches of lead and even less tungsten.

In accordance with some embodiments, the attenuating element 130 is installed, positioned, or placed within the primary collimator 120 to enable an amount of pre-attenuation to facilitate at least one of the following:

Reducing a probability of saturation of the signals acquired;

Reducing a probability of destroying the electronics components located close to the high-dose X-ray beam 140 (since the electronics components benefit from attenuation of the X-rays through the shielding of primary collimator 120); and/or Moving acquisition of data corresponding to HVL measurement into a region less influenced by the low-energy component of the radiation spectrum and into a region more related to the end-point energy of the X-ray distribution of the linear accelerator.

FIG. 3 is a flowchart of a plurality of exemplary steps of a method 300 of determining an HVL value, in accordance with some embodiments of the present specification. Referring now to FIGS. 1 and 3, at step 302, the system 100 collects the measured raw X-ray intensity data within each detector element/pixel of a plurality of detector elements/pixels of the calorimeter 110 (which is configured as a stacked segmented array of the plurality of detector elements/pixels).

At step 304, the system 100 determines a ratio of a natural logarithm of the measured raw X-ray intensity data to a natural logarithm of 2 corresponding to each detector element/pixel. At step 306, the system 100 determines a function, such as a gradient of the ratio as a function of a cumulative attenuating thickness of the material of each detector element/pixel of the calorimeter 110. Finally, at step 308, the system 100 generates an HVL value by determining a negative reciprocal of the gradient.

Figure 2B:
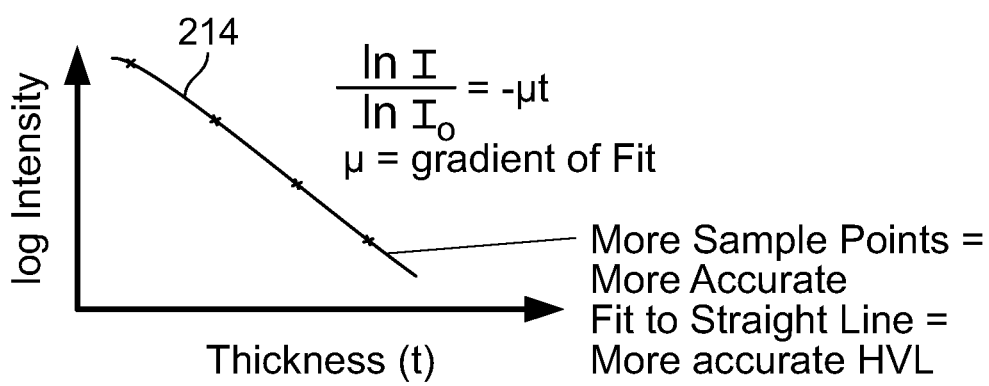
FIG. 2B shows a graph of the log of X-ray intensity versus cumulative thickness of a stacked, segmented array of detectors positioned within a secondary collimator of the X-ray system of FIG. 1, in accordance with some embodiments of the present specification.
Figure 2C:
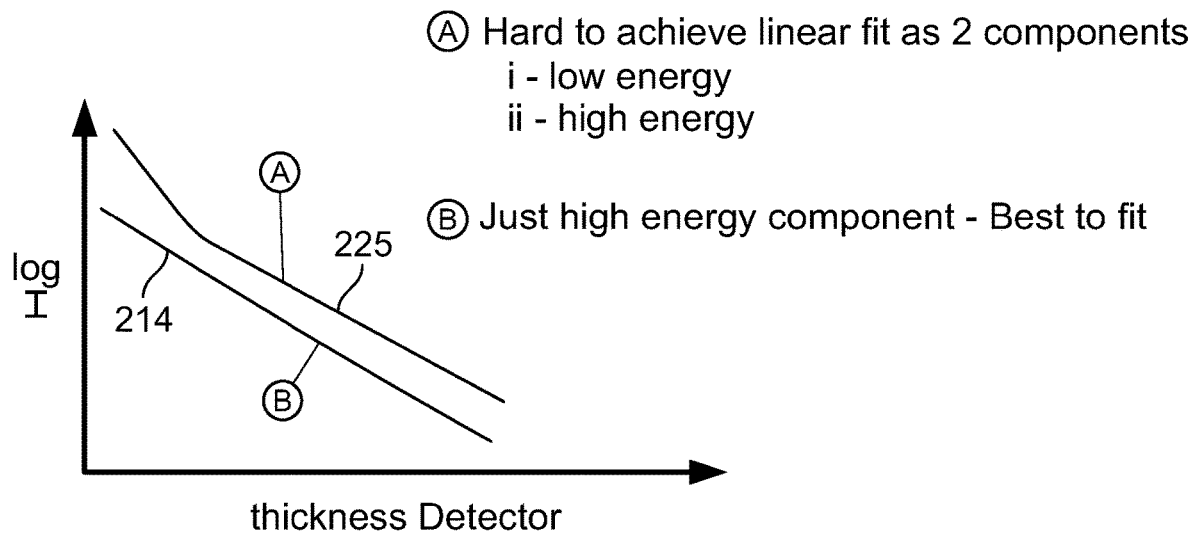
FIG. 2C shows a first graph and a second graph of the log of X-ray intensity versus cumulative thickness of the stacked, segmented array of detectors positioned within the secondary collimator of the system of FIG. 1, in accordance with some embodiments of the present specification.

Stated differently, data is first determined corresponding to a ratio of a natural logarithm of the measured raw X-ray intensity data to the natural logarithm of 2 corresponding to each detector element/pixel (step 304). Thereafter, the data is plotted as a function of a cumulative attenuating thickness of the material of each detector element/pixel. As shown in FIG. 2B a line 214 is determined that best fits the plotted data. Subsequently, a gradient of the line 214 of best fit is determined (step 306). A negative reciprocal of the gradient generates the HVL value (step 308).

Figure 2D:
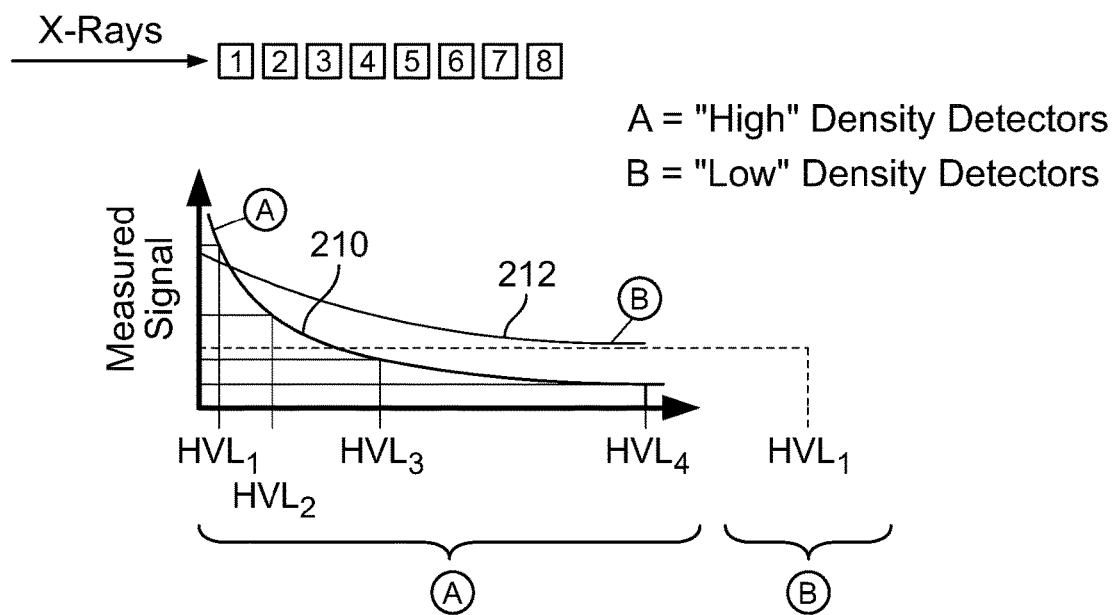
FIG. 2D shows a first curve and a second curve corresponding to a first detector material and a second detector material, respectively, being used to determine a Half-Value Layer (HVL) value.
Figure 2E:
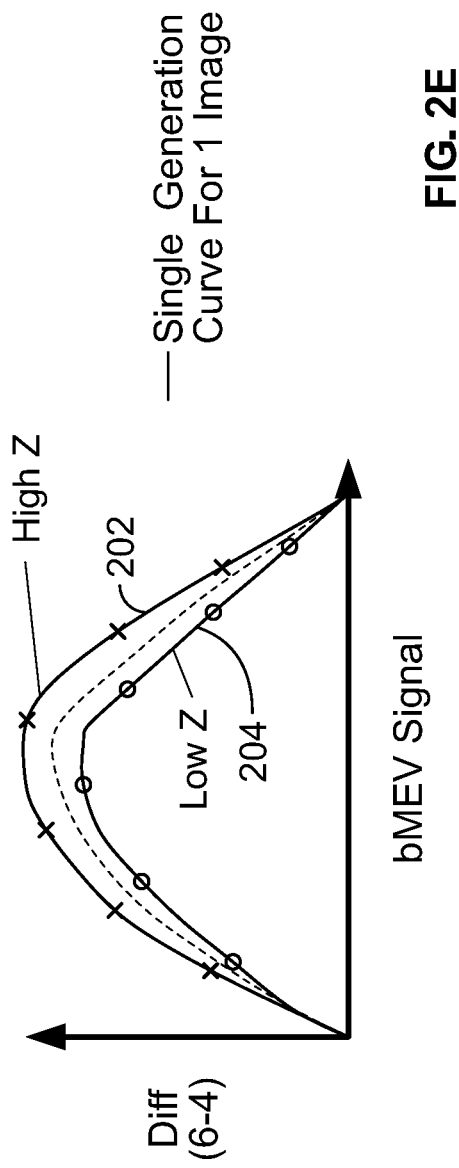
FIG. 2E shows a first material separation curve and a second material separation curve obtained if an energy of a linac remains constant throughout a scan, in embodiments of the present specification.
Figure 2F:
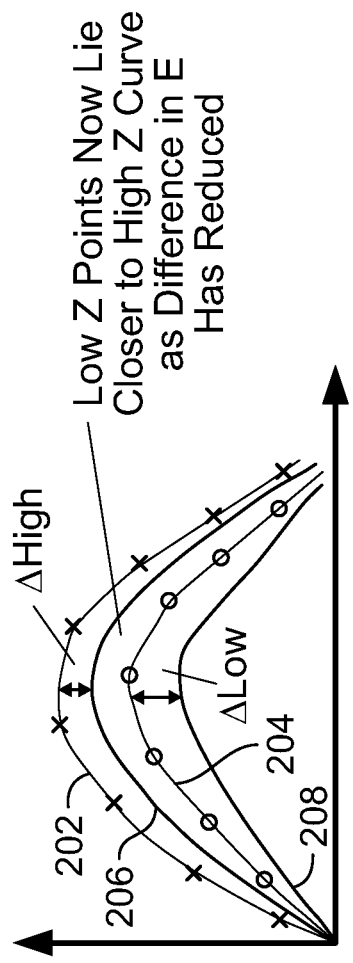
FIG. 2F shows a shift in the first and second material separation curves as a result of modulation of the high-energy peak output of 6 MeV to 5.8 MeV, in accordance with some embodiments of the present specification.

FIG. 2F compares the line 214 of best fit with a plot 225. The plot 225 is a log plot of data points where low attenuation data points are included resulting in the plot 225 that is not a linear fit. When the low attenuation data points are not included then a linear fit (in the form of the line 214) is realized allowing an accurate HVL to be determined.

In some embodiments, the HVL value is approximately 24 mm p/m 0.003 mm for 6 MeV radiation energy and approximately 21.6 p/m 0.003 mm for 4 MeV radiation energy.

As an illustration, FIG. 2D shows a first curve 210 and a second curve 212 corresponding to a first detector material and a second detector material, respectively, that are being used to determine the HVL value. The first detector is of higher density material compared to the second detector, in an embodiment. The X-axis represents cumulative thickness 't' of the stacked, segmented array of a plurality of pixels while the Y-axis represents the measured X-ray intensity data or signal. As shown, the first curve 210 demonstrates that for a dense material, more X-rays are attenuated in a given volume and therefore the HVL value is reached more quickly. Comparatively, the second curve 212 is a flatter curve (compared to the first curve 210) which demonstrates that if the detector material is less dense, then it takes more of the material to attenuate away half of the X-ray dose. Both the first and second curves 210, 212 would give the same HVL value when accounting for the measurement material. This is important when considering available space for making the measurement, and the range of materials to use for this purpose.

Using HVL Data to Correct a Scan Image

In accordance with some aspects of the present specification, the determined or measured HVL data is used to correct a scan image, of an object, post scanning, in order to provide better material colorization consistency across a scan. In some embodiments, the measured HVL data is directly linked to calibration data for material separation. In some embodiments, the HVL data measurement per pulse is included in a raw X-ray image data line.

Figure 4A:
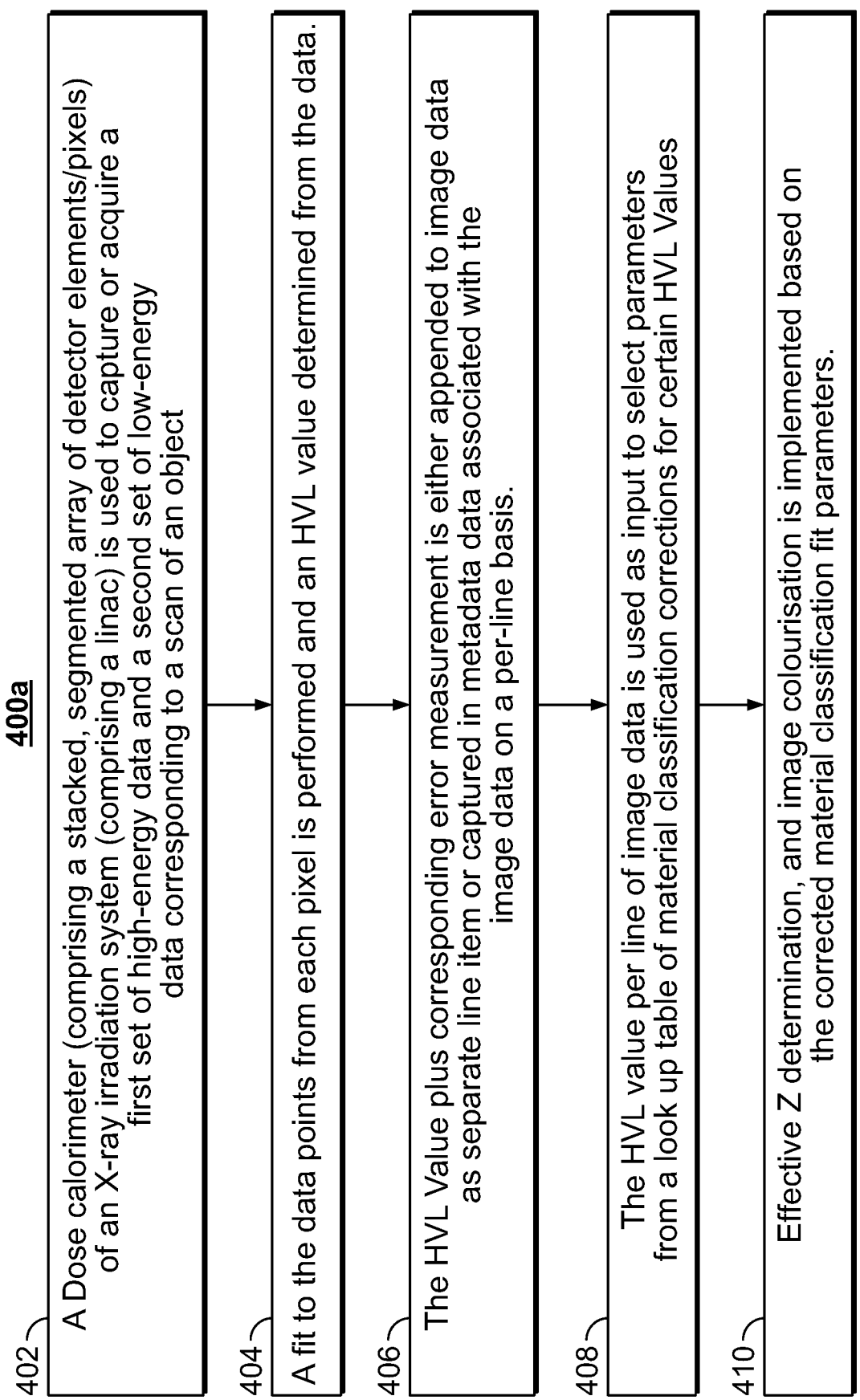
FIG. 4A is a flowchart of a plurality of exemplary steps of a method of using measured HVL data to correct, post image capture, the scan image of an object in order to provide better material identification consistency across a scan, in accordance with some embodiments of the present specification.

FIG. 4A is a flowchart of a plurality of exemplary steps of a first method 400a of using measured HVL data to correct, post capture, a scan image of an object in order to provide better material identification/colorization consistency across a scan, in accordance with some embodiments of the present specification. Referring now to FIGS. 1 and 4A, at step 402, the calorimeter 110 (configured as a stacked, segmented array of a plurality of detector elements/pixels) is used to capture or acquire a first set of high-energy data (pertaining to a first high-energy peak output of, for example, 6 MeV) and a second set of low-energy data (pertaining to a second low-energy peak output of, for example, 4 MeV) corresponding to a scan.

At step 404, a fit to the data points from each detector element/pixel is performed and an HVL value is determined from the data (see method 300 of FIG. 3). At step 406, the determined HVL value, along with the corresponding error measurement, is either appended to image data as separate line item or captured in metadata associated with the image data on a per-line basis.

At step 408, the HVL value per line of image data is used as input to select parameters from a look up table (LUT) of material classification corrections for a plurality of HVL values. Thereafter, at step 410, effective Z (that is, atomic number for material identification) and image colorization are implemented based on the corrected material classification fit parameters.

Figure 4B:
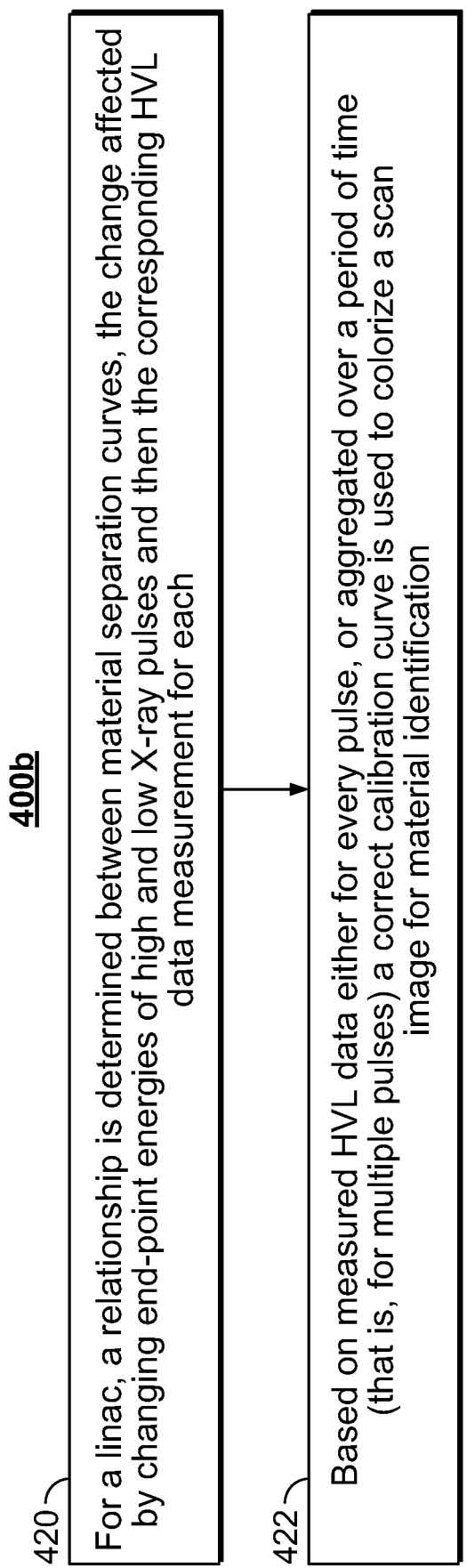
FIG. 4B is a flowchart of a plurality of exemplary steps of another method of using measured HVL data to correct, post image capture, the scan image of an object in order to provide better material identification consistency across a scan, in accordance with some embodiments of the present specification.

FIG. 4B is a flowchart of a plurality of exemplary steps of a second method 400b of using measured HVL data to correct, post capture, a scan image of an object in order to provide better material identification/colorization consistency across a scan, in accordance with some embodiments of the present specification. Referring to FIGS. 1 and 4B, at step 420, as part of a commissioning exercise on the linac 105, a relationship is determined between material separation curves, the change affected by changing end-point energies of high and low X-ray pulses and then the corresponding HVL data measurement for each. This would result in either a number of different material separation curves for each HVL data point (high and low-energy data) or a function that describes a change across all HVL data values.

Thus, in accordance with aspects of the present specification, the linac output energies are altered to mimic a change that may be seen in a typical scanning operation. In some embodiments, this may be done through adjustments to the control parameters on the linac magnetron AFC (automatic frequency tuner) which acts as a tuning shaft to ensure the RF frequency from the magnetron matches the standing wave frequency in the accelerating structure. Detuning from resonance results in changes to electron acceleration and consequently maximum X-ray energy. As detuning is affected on either side of resonance the HVL measurement change is observed from the stacked array along with a material separation data change when scanning a calibration fixture. The material separation data is stored as a LUT (Look Up Table) and referenced through the HVL measurement.

Consequently, at step 422, based on the measured HVL data either for every pulse, or aggregated over a period of time (that is, for multiple pulses) a correct material separation (matsep) calibration curve is used to colorize the scan image appropriately for material identification. The correct material separation calibration curve corresponds to the curve generated when the linac 105 is outputting at the desired energies for the high and low-energy pulses (typically 6 and 4 MeV).

FIG. 2E shows first and second material separation (material separation) curves/plots 202, 204 obtained if the linac energy remains constant throughout a scan. The Y-axis corresponds to a difference between the scan signal measured from 6 MeV and 4 MeV outputs of a linac. The X-axis corresponds to the 6 MeV signal intensity. The first material separation curve 202 corresponds to a first material (plastic) while the second material separation curve 204 corresponds to a second material (steel). The first plurality of data points (represented by 'crosses') on the first material separation curve 202 correspond to different thicknesses of the first material. Similarly, the second plurality of data points (represented by 'circles/dots') on the second material separation curve 204 correspond to different thicknesses of the second material.

FIG. 2F shows a shift in the first material separation curve 202 and second material separation curves 204 as a result of modulation of the high-energy peak output of 6 MeV to 5.8 MeV, in accordance with some embodiments of the present specification. As shown, the first curve 202 changes to a third curve 206 while the second curve 204 changes to a fourth curve 208. As the high energy drops to 5.8 MeV from 6 MeV, a smaller signal difference is realized between the signals corresponding to the third curve 206 and those corresponding to the second curve 204. This reduces the Y-axis value for each material thickness that is measured. In other words, a drop in the high-energy value impacts the difference value (Y axis) in intensity between the low and high signals for each point and can result in misclassification of materials if the points drop so much that they overlap with curves for different materials.

It should be appreciated that if HVL data is not used to apply a correction to the scan image and if the energy of either the high or low X-ray pulse changes, the calibration curves change and image regions are incorrectly colored within the scan image, as the calibration would indicate that the image regions belong to different material classifications.

Using HVL Data as Positive Feedback Input into a Linac

In accordance with some aspects of the present specification, the determined or measured HVL data is used as a positive feedback input into the linac 105 itself so as to be able to correct for energy drift over the period of a scan to maintain material identification consistency. This aspect is particularly useful for longer scans (for example, a scan time of up to 10 secs for portal-based scanners, a scan time of up to 2 minutes for gantry-based scanners and a scan time of 30 to 60 minutes for rail-based scanners), which are characteristic of rail-based platforms, for example. The longer a scan the higher the chance that a linac may exhibit a low-frequency drift in energy and dose output as a consequence of changes to the external environment, as well as internal thermal effects as the system continues to heat throughout the scan.

As known to persons of ordinary skill in the art, for an X-ray tube or a linac, a change in the energy of the emitted photons corresponds to a change in the energy of the electron beam. There are three major factors which can change electron beam energy:

Beam loading;
RF power being accepted by an accelerating cavity; and
The timing between the emission of electrons and the RF power entering the accelerating cavity.

In various embodiments, the measured real-time HVL data is utilized as a feedback on the factors of beam loading and the RF power being accepted by the accelerating cavity of the linac. To determine whether a change in the measured HVL data is due to a change in beam loading or a change in the RF power accepted by the accelerating cavity either the dose absorbed by the first detector element, crystal or pixel (detector element 110a of the calorimeter 110 of FIG. 1) or the dose measured by the reference detector 135 of FIG. 1 is used. It should be appreciated that the first detector element, crystal or pixel (of the calorimeter 110) will receive a signal dominated by the low-energy component of the X-ray pulse and is therefore a good probe of the cause of the output change.

The measured HVL data changes as the linac characteristics alter throughout scanning. Typically, a lot of heat is generated whilst producing X-rays. The heat is dissipated in the magnetron and accelerator and can cause expansion in the magnetron and accelerator cavities, changing resonant frequencies, and altering electron acceleration energies.

Figure 5:
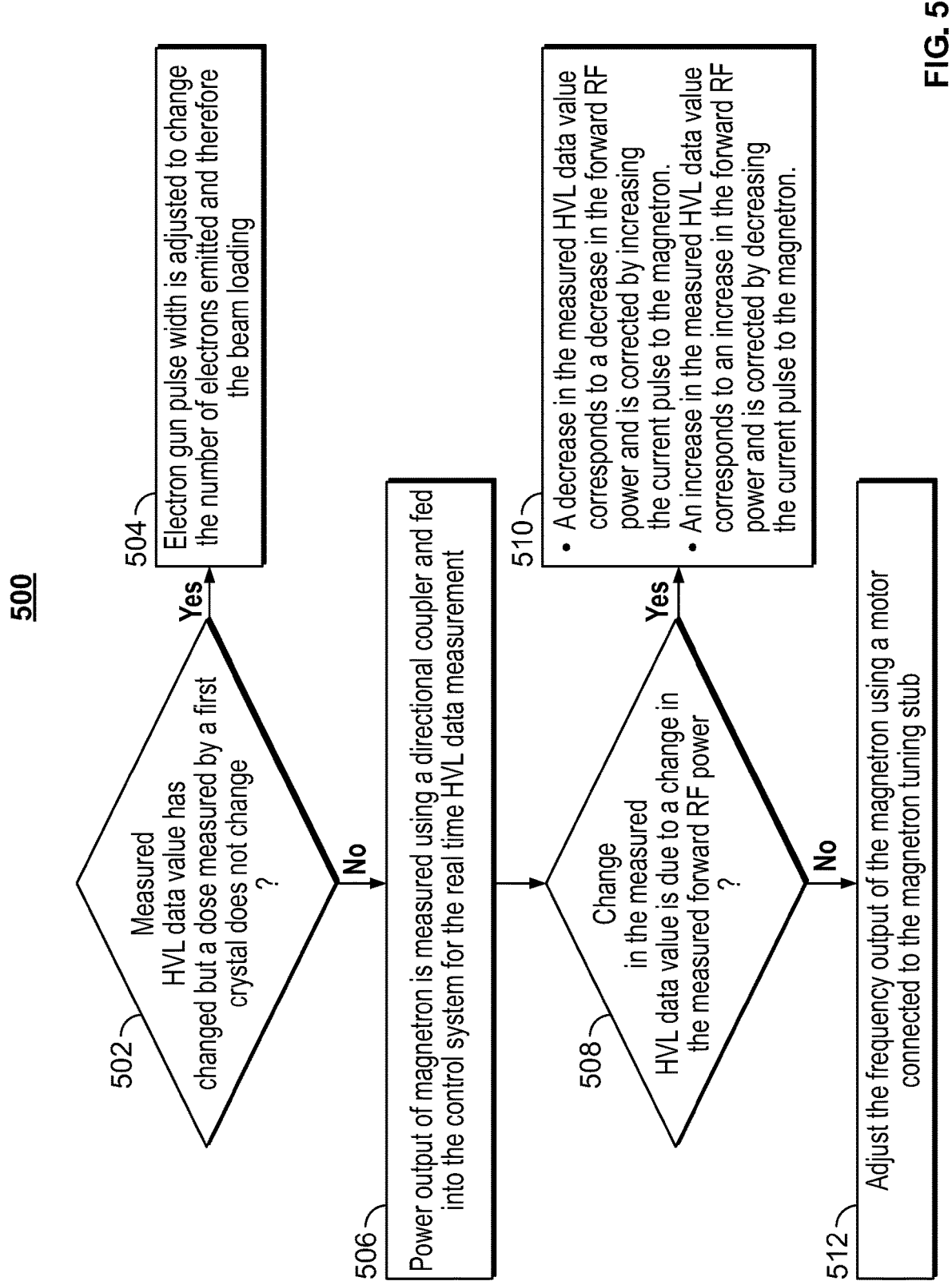
FIG. 5 is a flowchart of a plurality of exemplary steps of a first method of using real-time HVL data measurement as a positive feedback input into a linac to correct for energy drift, in accordance with some embodiments of the present specification.

FIG. 5 is a flowchart of a plurality of exemplary steps of a method 500 of using real-time HVL data measurement as a positive feedback input into a linac to correct for energy drift, in accordance with some embodiments of the present specification. At step 502, it is determined if a measured HVL data value has changed but the measured dose does not change. If yes, then this is indicative that the change in the measured HVL data value is due to a change in beam loading. This is because dose is related to energy fluence and if the HVL data value has changed but the dose has not then the number of photons must have changed accordingly. It should be appreciated that the measured HVL data value changes as the linac characteristics alter throughout scanning. Typically, a lot of heat is generated while producing X-rays. The heat is dissipated in the magnetron and accelerator and can cause expansion in the magnetron and accelerator cavities, changing resonant frequencies, and altering electron acceleration energies. Consequently, in this case:

An increase in the measured HVL data value indicates that the energy of the electrons has increased but the number of electrons has decreased; and A decrease in the measured HVL data value indicates that the energy of the electrons has decreased but the number of electrons has increased.

Accordingly, at step 504, the electron gun pulse width is adjusted which would change the number of electrons emitted and therefore the beam loading. Thus, if the measured HVL data value increased then the electron gun pulse width is increased and if the measured HVL data value is decreased then the electron gun pulse width is decreased.

However, referring back to step 502, if it is determined that the measured HVL data value has changed and the measured dose also changes then this indicates that the resulting energy change is due to a change in the RF power being accepted by the accelerating cavity of the linac. A change in RF power being accepted by the accelerating cavity is caused by a change in the power output of the magnetron (of the linac) and/or a change in the amount of reflected power from the accelerating cavity. Therefore, at step 506, to determine if the RF power output of the magnetron has changed, the RF power is measured using a directional coupler and the resulting measurement of the RF power is fed into the control system (that is, the computing device 125 and/or PLC 122 of FIG. 1) for continued real time HVL data measurement.

At step 508, it is determined if a change in the measured HVL data value is due to a change in the measured forward RF power. If yes, then at step 510:

A decrease in the measured HVL data value corresponds to a decrease in the forward RF power and is corrected by increasing the current pulse to the magnetron.

An increase in the measured HVL data value corresponds to an increase in the forward RF power and is corrected by decreasing the current pulse to the magnetron.

However, at step 508, if it is determined that the change in the measured HVL data value does not correspond to a change in the measured forward RF power this indicates that it is a result of the cavity detuning and an increase in the reverse power. Consequently, at step 512, this is corrected by adjusting the frequency output of the magnetron using a motor connected to the magnetron tuning stub. To perform this correction the tuning stub is moved a small distance in one direction and the HVL data value is monitored, as follows:

If the measured HVL data value approaches closer to an original value the tuning stub is moved further in the same direction until the measured HVL data value returns to the original value.

If the measured HVL moves further away from the original value the tuning stub is moved in the opposite direction until the measured HVL returns to the original value.

Reference Detector

Referring back to FIG. 1, in embodiments, the reference detector 135 is positioned in front of the linac 105 and within the secondary collimator assembly 115. In some embodiments, the reference detector 135 electronics board comprises two parallel preamplifier stages that allow for a sufficiently large signal measurement in both low and high energy dose regimes.

Figure 6A:
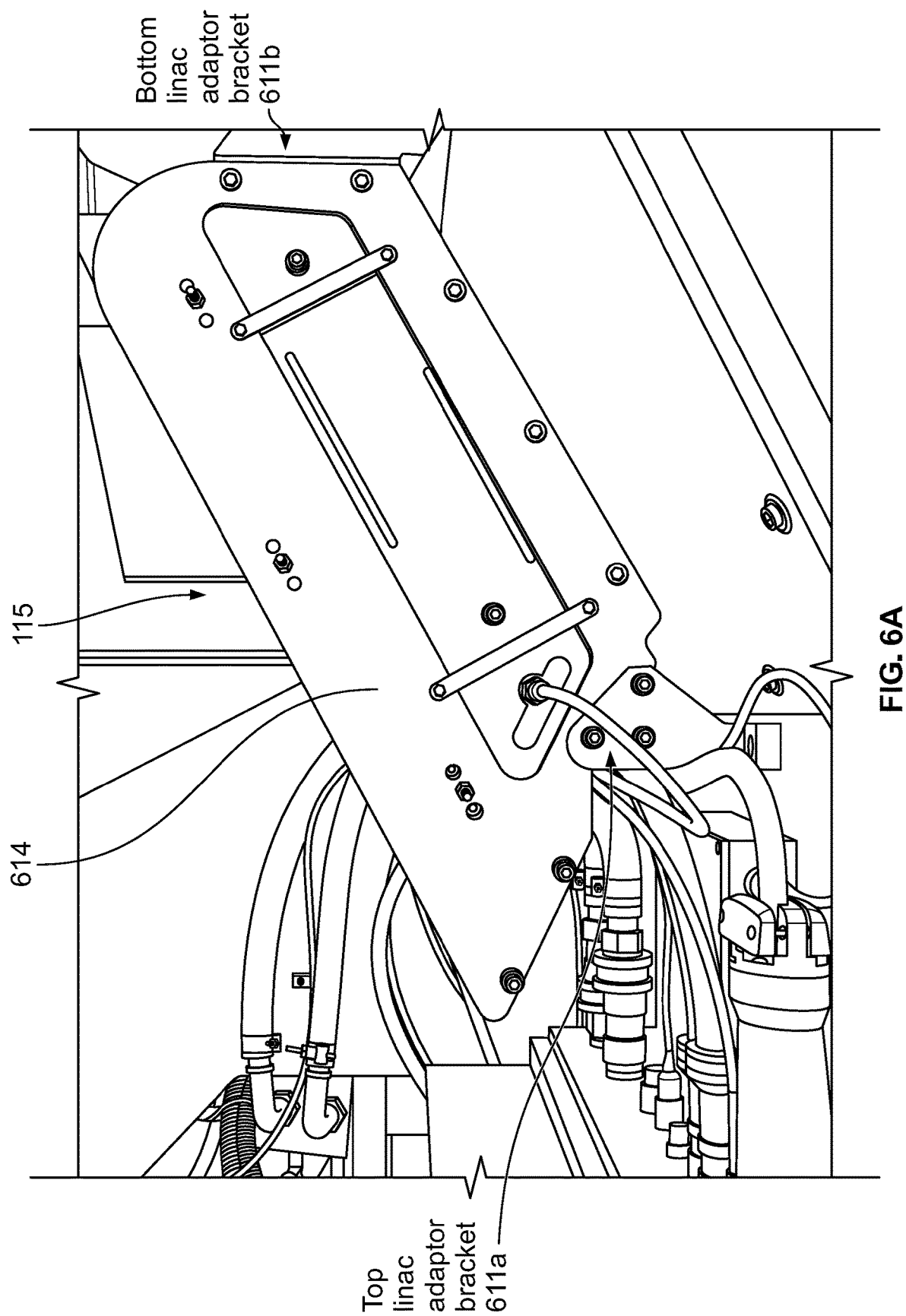
FIG. 6A shows a side view of a secondary collimator assembly, in accordance with some embodiments of the present specification.
Figure 6B:
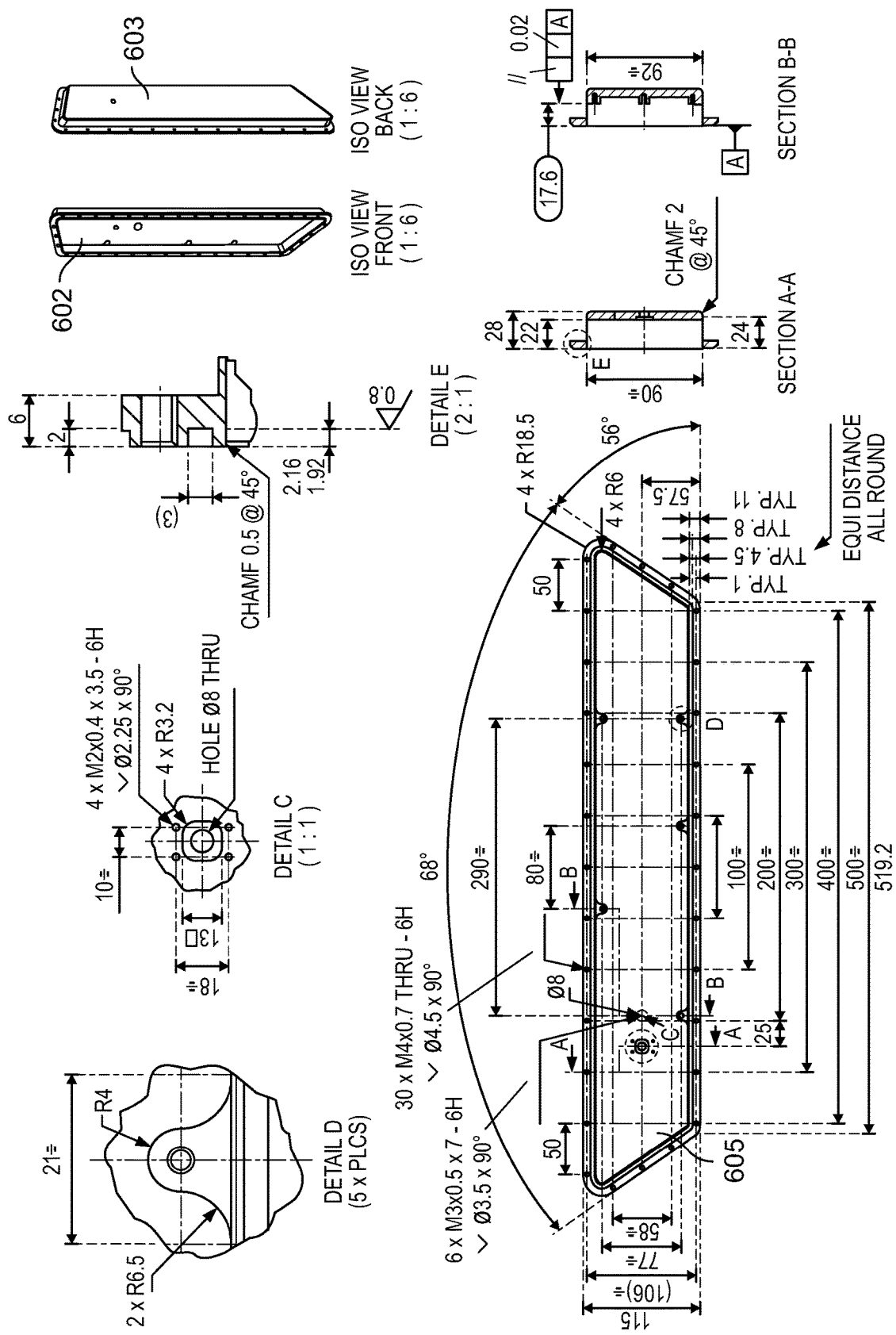
FIG. 6B shows a line diagram of a reference detector housing, in accordance with some embodiments of the present specification.

FIG. 6A shows a first side 614 of the secondary collimator assembly 115 while FIG. 6B shows a line diagram of a reference detector housing 605 that resides within the secondary collimator assembly 115, in accordance with some embodiments of the present specification. FIG. 6B also shows first and second sides 602, 603 of the housing 605. FIG. 6C shows the reference detector housing 605 removed from the secondary collimator assembly 115. Referring now to FIGS. 1, 6A, 6B and 6C, in embodiments, the reference detector 135 is supported and enclosed within the dedicated housing 605 that is configured to fit within the secondary collimator assembly 115.

The housing 605 is designed to minimize material in an X-ray beam plane to reduce attenuation. In some embodiments, the housing 605 is IP65 rated to allow for use on X-ray inspection systems where the secondary collimator 115 is external. In some embodiments, the housing 605 includes a dehumidifier. In some embodiments, the reference detector housing 605 has an approximately trapezoidal shape. In some embodiments, the reference detector housing 605 holds two parallel copper plates of an ion chamber at a predefined fixed separation or distance 'd'. FIG. 6D shows two parallel copper plates 650 of the ion chamber positioned on each side of the housing 605. The fixed location on each side of the housing 605 ensures the predefined separation or distance at all times. In some embodiments, the distance is 6 mm.

Figure 6E:
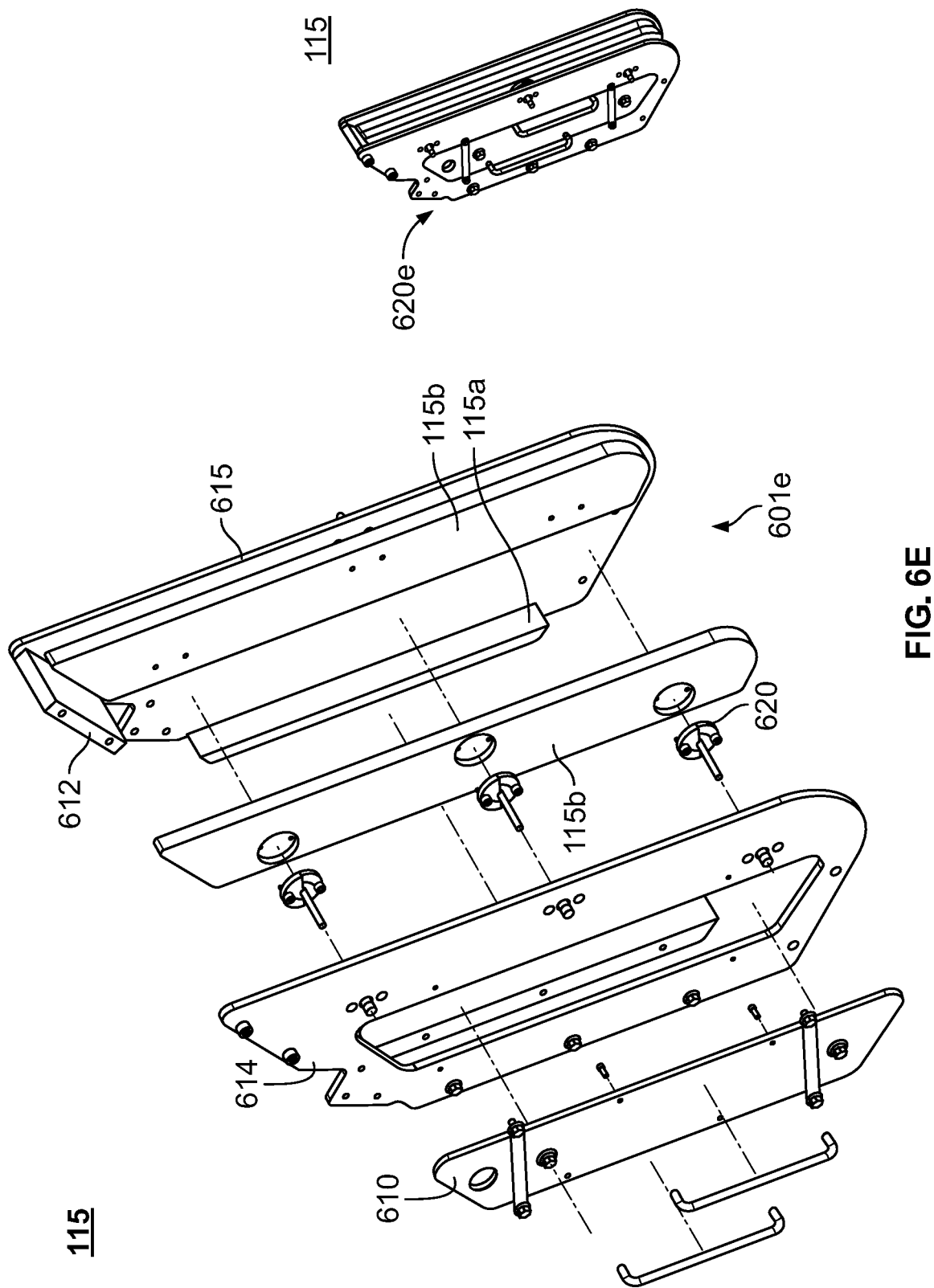
FIG. 6E is an exploded view of the secondary collimator assembly, in accordance with some embodiments of the present specification.

FIG. 6E shows an exploded view 601e and an isometric view 602e of the secondary collimator assembly 115 (with reference to FIG. 1), in accordance with some embodiments of the present specification. The assembly 115 comprises a cover plate 610, a top support 612, first side plate 614 and second side plate 615, scatter catchers or the first set of collimating jaws 115a, collimator adjustment assembly 620 along with the second set of collimating jaws 115b. In embodiments, the reference detector housing 605 (FIGS. 6A, 6B) is mounted to the removable side plate 614 of the collimator 115 such that the first side plate 614 (along with the mounted reference detector housing 605) can be inserted and removed from a side of the assembly 115 without having to require realignment of the reference detector housing 605 within the assembly 115 when the plate 614 is inserted back into the assembly 115. The first side plate 614 and the second side plate 615 of the secondary collimator assembly 115 holds the collimator assembly 115 together, enabling alignment with an X-ray fan beam every time. Each of the first and second sides 614, 615 holds a jaw of the first and second sets of collimating jaws 115a, 115b. The first and second sides 614, 615 are attached by the cover plate 610 along with top and bottom linac adapter brackets 611a, 611b (FIG. 6A). Thus, the housing 605 is designed to fit in the secondary collimator 115 in a way that guarantees alignment every time. This allows the same secondary collimator assembly and reference detector to be used on all linac platforms.

Persons of ordinary skill in the art would appreciate that absolute X-ray radiation dose measurements, for the purposes of cumulative dose tracking and displaying to an operator, will vary over the course of a day as temperature and humidity vary, therefore the absolute dose measurements used for these purposes will need to be adjusted. Accordingly, in some embodiments, the reference detector plates support humidity and temperature sensors to allow for temperature and humidity-based data correction to account for different deployment environments and variations in temperature and humidity. In some embodiments, the temperature and humidity based data correction or adjustment (to data indicative of absolute X-ray radiation dose measurements) utilizes look-up tables generated in calibration procedures where the data indicative of absolute X-ray radiation dose measurements is captured by varying temperature and humidity and monitoring the change in output.

In embodiments, the reference detector 135 is configured to measure an X-ray radiation dose output of the linac 105 by measuring ionization of air between the two parallel copper plates 650 of FIG. 6D, separated by the predefined distance 'd'. As known to persons of ordinary skill in the art, a voltage is applied between the two copper plates 650 thereby generating an electric field in the space between them. When air, in the space between the copper plates 650, is ionized by an interaction of an X-ray (emanating from the linac 105) with an air particle, ion-pairs are created and the resultant positive ions and dissociated electrons move to the electrodes of the opposite polarity under the influence of the electric field, thereby generating an ionization current that is measured using a circuit.

First and second ions, of each ion pair, are respectively positively and negatively charged. The ion pairs need to be collected in order to detect the ion pairs inside the reference. One PCB (Printed Circuit Board) is positively charged to about 460V and forms an anode of the circuit that attracts the negatively charged ion of the pair. Another PCB forms a cathode (and is attached to digitizer electronics) of the circuit that attracts the positive charged ion of the ion pair. As the radiation passes through the ion chamber, air in the ion chamber becomes ionized, the more radiation that passes through the chamber results in higher ionization levels. As ions pairs get collected at the anode and cathode it causes current flow in the circuit that is amplified and communicated to the scanning system.

It should be appreciated that the predefined distance 'd' is a trade-off of signal capture, voltage applied to plates, sufficient separation to ensure the primary beam is not passing through the plates and anticipated ionization current from the X-ray pulse dose. In some embodiments, the predefined distance 'd' is 6 mm for ~450V plate voltage.

Figure 7A:
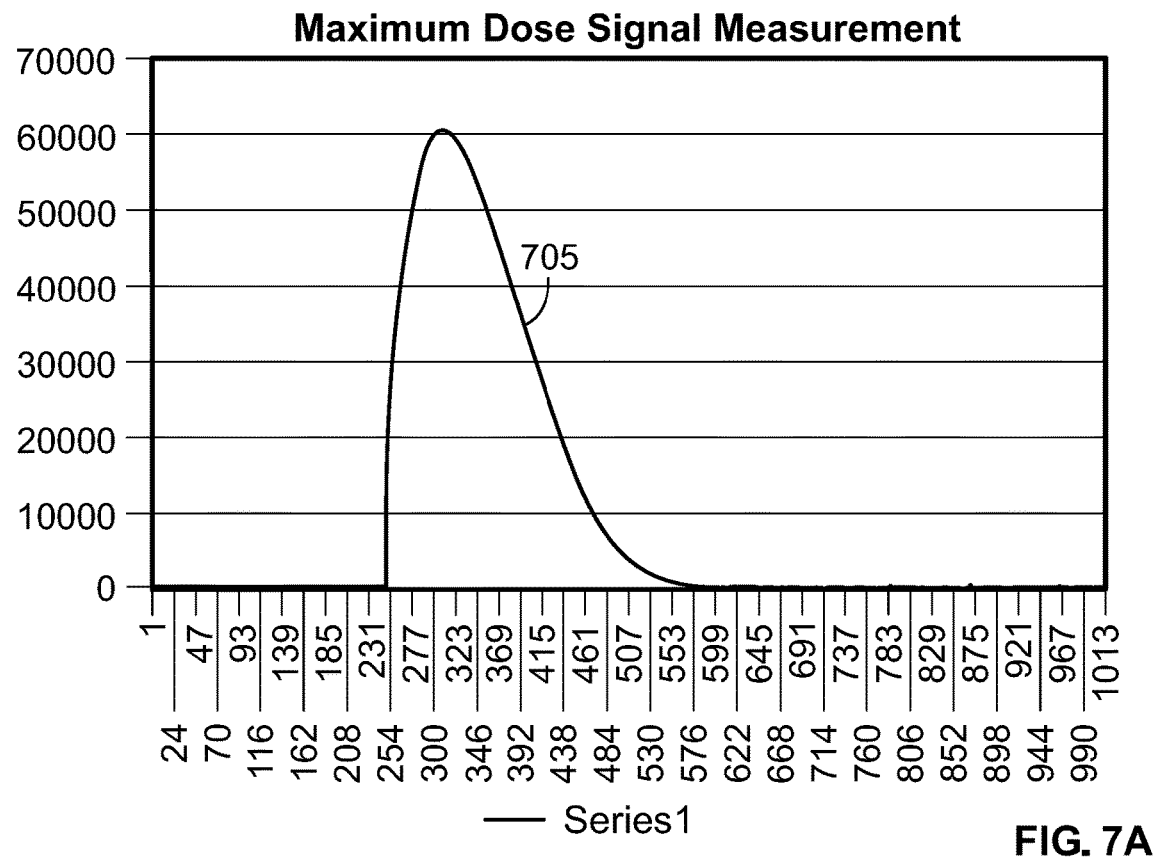
FIG. 7A shows a first exemplary curve corresponding to a maximum X-ray radiation dose signal measurement.
Figure 7B:
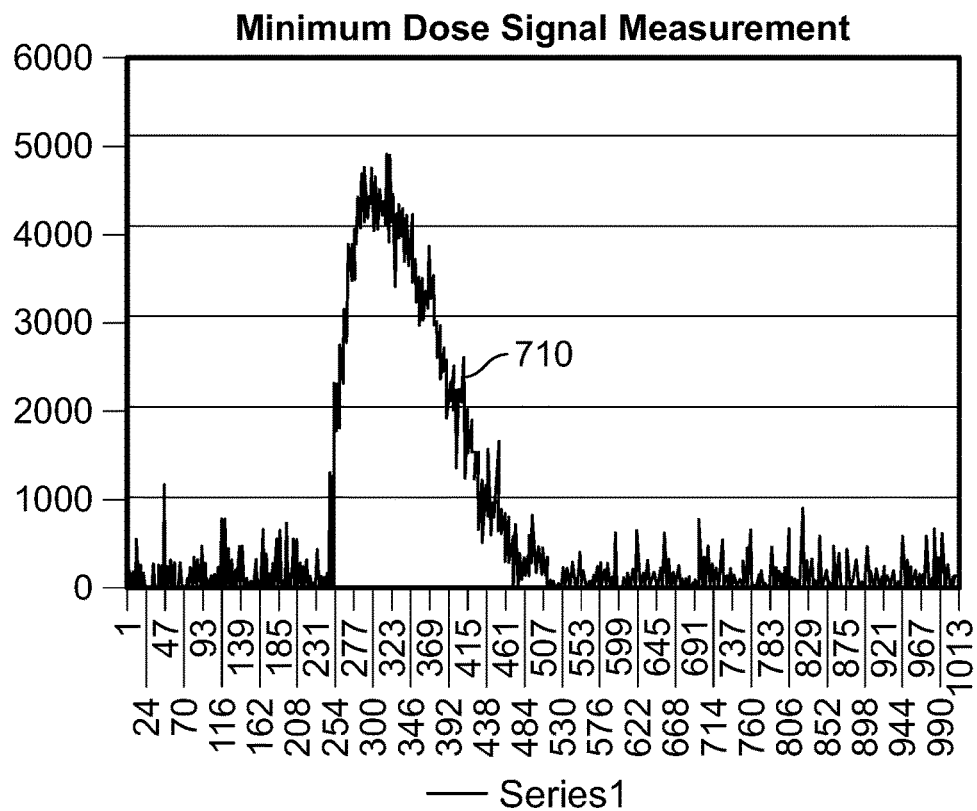
FIG. 7B shows a second exemplary curve corresponding to a minimum X-ray radiation dose signal measurement.

FIG. 7A shows a first exemplary curve 705 corresponding to a maximum X-ray radiation dose signal measurement while FIG. 7B shows a second exemplary curve 710 corresponding to a minimum X-ray radiation dose signal measurement. In one embodiment, a first area under the first curve 705 is 3,049,136 units while a second area under the second curve 710 is 208,769 units. In embodiments, a signal corresponding to the ionization current from the ion chamber is digitized and the first and second areas under the first and second curves 605, 610 calculated to give a number that is proportional to data indicative of the X-ray radiation dose output by the linac. The ionization current includes maximum and minimum signal components corresponding, respectively, to 170 pC (6 MeV) and 130 pC (4 MeV) of induced charge at ~50% maximum output.

In some embodiments, a radiation dose measurement circuit incorporates two independent measurement channels with different levels of amplification to improve the signal-to-noise ratio of the ionization current signal from the ion chamber that allows accurate dose measurement. A digitizer firmware automatically switches the two measurement channels to provide an optimal signal for further processing. In some embodiments, the two independent measurement channels share a front end low-level interface, a subsequent stage splits in two with separate low noise amplifiers with gains optimized to maximize the signal dynamic range and signal-to-noise ratio. The two independent measurement channels have separate ADCs (analog to digital converters) to allow simultaneous sampling of the ionization current signal on a pulse-by-pulse basis.

It should be appreciated that the two independent measurement channels allow for an ability to resolve both maximum and minimum anticipated dose signals from a single platform. This will be high-dose high penetration settings and occupied cab scan imaging settings. The amplification required to accurately measure the low-dose cab scan image would result in a white out of the signal at the higher dose, hence the need for two separate measurement stages or channels.

Correcting a Scan Image Due to Pulse-to-Pulse Changes in Linac Dose Output

In accordance with some aspects of the present specification, the measured data (on a pulse-by-pulse basis) indicative of the X-ray radiation dose output is used to correct a scan image due to pulse-to-pulse changes in linac dose output.

As the generation of X-rays from a linac follows a statistical nature, there is a fluctuation in the exact dose output from one pulse to the next, typically in a range of about 1% to 2% of the maximum dose value (although this is dependent upon the absolute dose value). This level of fluctuation can be enough to be visible or discernible to an operator in the scan image and also have an adverse impact on material separation or classification. Therefore, the measured data (on a pulse-by-pulse basis) indicative of the X-ray radiation dose output of the linac at each pulse can be used to correct the signal intensity across a whole detector array for that line of captured data to ensure that adjacent lines do not exhibit any step changes in intensity.

Figure 8:
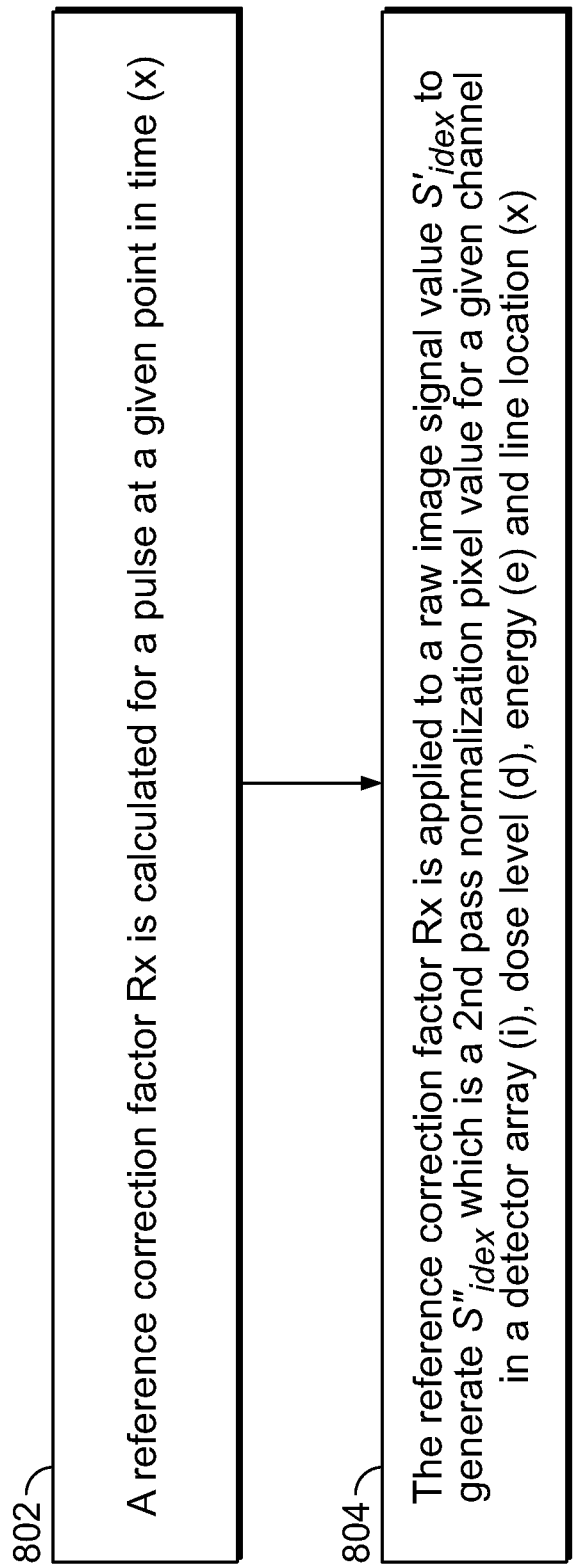
FIG. 8 is a flowchart of a plurality of exemplary steps of using measured data (on a pulse-by-pulse basis) indicative of the X-ray radiation dose output of a linac to correct a scan image due to pulse-to-pulse variations in the linac dose output, in accordance with some embodiments of the present specification.

FIG. 8 is a flowchart of a plurality of exemplary steps of using measured data (on a pulse-by-pulse basis) indicative of the X-ray radiation dose output of a linac to correct a scan image due to pulse-to-pulse variations in the linac dose output, in accordance with some embodiments of the present specification. In embodiments, each pixel within the scan image is normalized to remove pulse-to-pulse variation.

At step 802, a reference correction factor R_x is calculated for a pulse at a given point in time (x), as follows:

$$R_x = \left( \frac{\overline{R_{de}} - \overline{r}}{R_{dex} - \overline{r}} \right)$$

where, $\overline{R_{de}}$ is an average reference correction value while X-rays are on during calibration at dose level (d) and energy (e); $\overline{r}$ is an average reference correction value while X-rays are off; and $R_{dex}$ is a reference correction value at dose level (d), energy (e) and line location (x).

At step 804, the reference correction factor $R_x$ is applied to a raw image signal value $S'_{idex}$ to generate $S''_{idex}$ which is a 2nd pass normalization pixel value for a given channel in a detector array (i), dose level (d), energy (e) and line location (x). Specifically, $$S''_{idex} = S'_{idex} * R_x$$

Therefore, if $R_{dex}$ measures slightly lower than $\overline{R_{de}}$, $R_x$ will be a small positive number that when multiplied by the raw signal value $S'_{idex}$ results in a small positive adjustment to the total intensity of the line. Conversely, if the number is negative, the adjustment results in a reduction in intensity across the whole line.

Conventionally, $R_{dex}$ has been taken from a number of detectors at the top of the detector array, which are not expected to be occluded by an object being scanned (for example, a vehicle). However, not only are these detectors so far from the central axis of emission (from the linac) that the X-ray signal is low, but it is often the case that these detectors are the most difficult to align accurately, further amplifying the problem. This means the entire scan image is being "corrected" with low-intensity, noisy data, having a detrimental impact on image performance as a whole.

The reference detector 135, of the present specification, overcomes this issue by measuring the X-ray radiation dose output at the linac 105. Here the magnitude of the measurement is high, so the statistical error is smaller, resulting in a more accurate determination of the reference correction factor $R_x$. There are also no alignment issues as the reference detector 135 is positioned directly in front of the linac 105 within the secondary collimator 115.

Normalizing Data to be Used for Dynamic Dose Modulation

In accordance with some aspects of the present specification, the measured data (on a pulse-by-pulse basis) indicative of the X-ray radiation dose output of the linac is used for normalizing scan image data that may be used for dynamic dose modulation.

Dynamic dose modulation refers to the ability to modify the output dose-per-pulse of the linac so that only the dose required to image an object, such as a container, for example, is generated. That is, if imaging an empty container, the system should lower the dose output per pulse as a high-dose with high-penetration is not required. Conversely, if high-attenuation regions are observed in an image, the output can be increased in an attempt to provide sufficient penetration for imaging. Having an independent, unoccluded measure of the linac output per pulse is necessary to correct images captured with varying dose-per-pulse throughout a scan.

Figure 9:
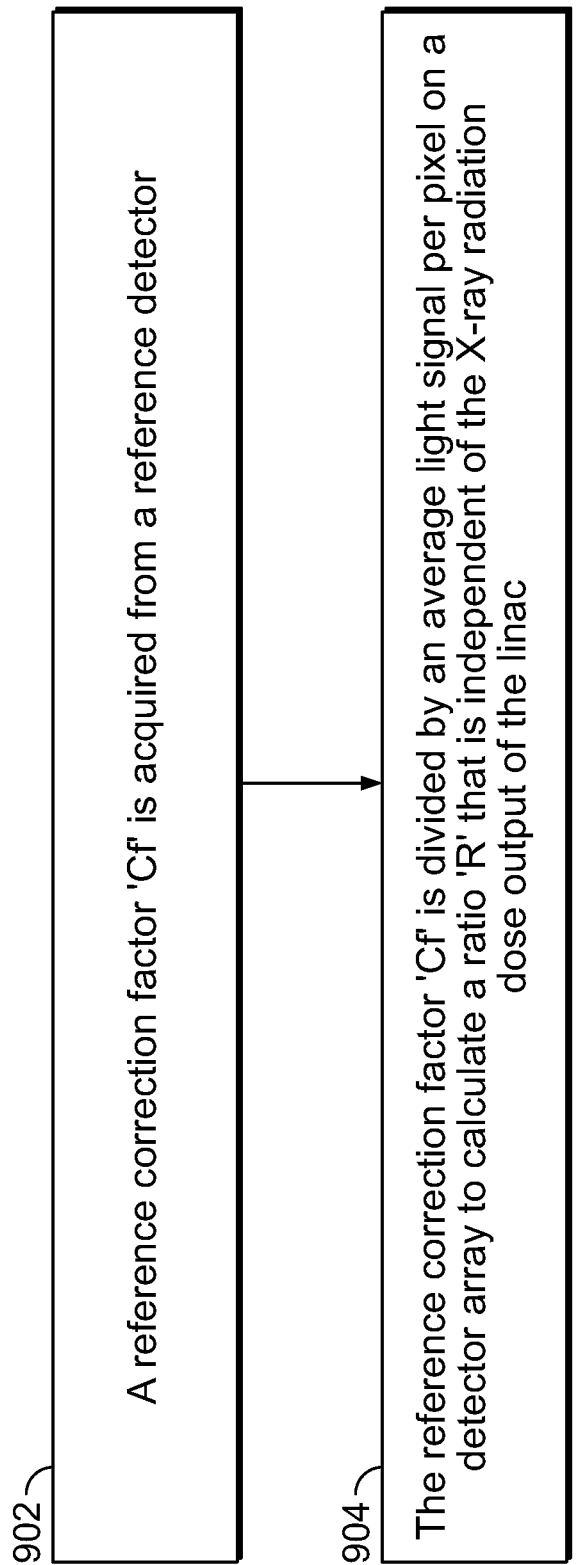
FIG. 9 is a flowchart of a plurality of exemplary steps of a method of normalizing scan image data for dynamic dose modulation of a linac, in accordance with some embodiments of the present specification.

FIG. 9 is a flowchart of a plurality of exemplary steps of a method of normalizing scan image data for dynamic dose modulation of a linac, in accordance with some embodiments of the present specification. At step 902, a reference correction factor 'Cf' is acquired from the reference detector 110 (FIG. 1). The reference correction factor Cf is the same as $R\_x = (((R\_de) \overline{-r})/(R\_dex - r\overline{\phantom{-}}))$ determined at step 802 of FIG. 8.

At step 904, the reference correction factor '$C_f$' is divided by an average light signal per pixel on a detector array to calculate a ratio 'R' that is independent of the X-ray radiation dose output of the linac. In embodiments, the scan image data line is multiplied by the value R to account for a change in the output of the linac during a scan.

In embodiments, the ratio 'R' is reflective of obstruction in a scan tunnel for all linac outputs and is required for accurately combining scan image data from adjacent pulses at different X-ray radiation dose outputs. Thus, for two consecutive pulses imaging the same portion of an object under inspection (for example, a vehicle or a cargo container), the same response would be expected from one pulse to the next. However, if the X-ray radiation dose output of the linac changes or varies, this could be misinterpreted as a change in the cargo composition of a cargo container, for example, if variation in the output of the linac itself is not accounted for. The measured data (on a pulse-by-pulse basis) indicative of the X-ray radiation dose output of the linac, using the reference detector, provides a ground truth for linac output.

Tracking Cumulative Dose Output

Referring back to FIG. 1, in accordance with some aspects of the present specification, the measured data (on a pulse-by-pulse basis) indicative of the X-ray radiation dose output is used for tracking cumulative X-ray radiation dose output (of a linac) that may subsequently be used for dynamic dose modulation. In embodiments, the reference detector 135 enables tracking of X-ray radiation dose output throughout a scan, a portion of a scan, or over a period of time such as, but not limited to, over hours, days or weeks. It should be appreciated that tracking of the cumulative X-ray radiation dose output is less an examination of the pulse-to-pulse dose stability and variation of a linac, and more a monitor of an absolute dose output of the linac.

Conventional X-ray inspection systems, used to scan vehicles occupied by people, lack the capability to determine whether, during a scan, the linac is outputting a predefined safe X-ray radiation dose for imaging people. In accordance with an aspect of the present specification, interlocking an X-ray inspection system, for scanning occupied vehicles or cargo containers, for example, to the X-ray radiation dose measurement of the reference detector 135 ensures safe operation since X-ray emission from the linac may be stopped if the radiation dose output of the linac exceeds a predefined threshold dose '$T_d$' considered to be safe for scanning people.

In various embodiments, the PLC (Programmable Logic Controller) 122 and/or the computing device 125 of the linac 105 stores at least one predefined threshold dose '$T_d$'. The safety PLC 122 is configured to disarm the linac 105 based on the at least one predefined threshold dose '$T_d$' being approached or exceeded. In some embodiments, a raw analog signal (corresponding to the X-ray radiation dose) is fed, from the reference detector 135, to the PLC 122 so that if the reference detector 135 faults, the PLC 122 has direct knowledge of this and can terminate X-ray generation. The raw analog signal means that the data can potentially b e incorporated into the "safety circuit" of the PLC 122.

That is, the raw analog signal is fed to the PLC 122 to be used as part of the X-ray inspection system interlocking sequence. The interlocking sequence involves a comparison of the measured signal, from the reference detector 135, in the PLC 122 with the at least one predefined threshold dose '$T_d$'. If the dose exceeds this threshold, the X-ray source 105 is disabled preventing excessive exposure to any occupants in a vehicle being scanned.

Thus, the reference detector 135 provides independent confirmation of whether the linac is outputting in an appropriate mode when imaging occupied vehicles. In some embodiments, the linac 105 is configured by the PLC 122 and/or the computing device 125 to operate in one of four modes—a first mode corresponding to no X-rays being emitted, a second mode corresponding to Cab Scan, a third mode corresponding to High Dose only and a fourth mode corresponding to Interlaced emission (or Dynamic Dose). Each one of the first, second, third and fourth mode is appropriate for a given scanning segment or concept of operation (ConOps). For instance, a command to fire X-rays when imaging an occupied region of a vehicle enables the second mode. When it is deemed that the occupied region has passed, the PLC may switch the command to interlaced (fourth mode) or high dose (third mode). In the third mode (high dose) or the fourth mode (interlaced), the ionization levels are significantly higher than those in the second mode (cab scab).

In embodiments, the reference detector 135 also enables tracking of total emission of X-rays (or cumulative X-ray radiation dose output) over a longer period of time such as, but not limited to, over hours, days or weeks. Such tracking is advantageous to ensure that implementation of dynamic dose modulation does not result in an increase in the dose footprint of an X-ray inspection system, relative to what is predetermined, expected and measured for a constant dose output.

For example, scanning 20 trucks at dose output of 7/10 generates a required exclusion zones for an X-ray inspection/scanning system. However, it would also be true of 10 scans where the output is 4/10 (say, scanning of empty containers where less dose is needed to achieve necessary performance) and 10 scans where the output is 10/10 (say, scanning of dense cargo where extra penetration is required to image accurately). The average output is still 7/10. However, a distribution of light goods and heavy goods in vehicles are not known prior to scanning, so the X-ray inspection system needs to monitor its own output and determine when the equivalent of 7/10 has been met. If 14 scans required 10/10 dose, then the X-ray inspection system would self-disable as any of the next 6 scans would take the output beyond an allowed level to achieve the exclusion zone. The disable would last until the hour is up and then scanning can be resumed.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A linear accelerator comprising:
   a magnetron;
   a target;
   an electron gun, wherein the electron gun is configured to generate a beam of X-rays by directing an accelerated beam of electrons at the target;
   a primary collimator positioned along a direction of the beam of X-rays;
   a secondary collimator positioned to receive the beam of X-rays exiting the primary collimator;
   an attenuating element positioned within an aperture of the primary collimator;
   a calorimeter positioned within the aperture of the primary collimator;
   a reference detector positioned proximate the secondary collimator and configured to generate data indicative of an X-ray radiation dose output for at least some pulses of the beam of X-rays;
   a detector configured to detect at least a portion of the beam of X-rays and generate image data; and
   a computing device comprising programmable logic and in data communication with the detector and reference detector, wherein the computing device is configured to use said data indicative of the X-ray radiation dose output to perform at least one of a) correcting the image data by calculating a reference correction factor for at least one of said pulses and applying said reference correction factor to pixel values in the raw image data to generate normalized pixel values and b) normalizing the image data by acquiring a reference correction factor from the reference detector and using a function of the reference correction factor and data indicative of an amount of light per pixel in the image data to calculate a value that is independent of the X-ray radiation dose output.

2. The linear accelerator of claim 1, wherein the target is positioned between the electron gun and the primary collimator.

3. The linear accelerator of claim 1, wherein the secondary collimator is coupled to an end of the primary collimator.

4. The linear accelerator of claim 1, wherein the attenuating element and the calorimeter are positioned within the primary collimator.

5. The linear accelerator of claim 1, wherein the reference detector is positioned within the secondary collimator.

6. The linear accelerator of claim 1, wherein at least one of the primary collimator or secondary collimator has a fixed beam-shaping aperture.

7. The linear accelerator of claim 1, wherein at least one of the primary collimator or secondary collimator has a variable beam-shaping aperture.

8. The linear accelerator of claim 1, wherein the attenuating element is configured to shift data corresponding to a half value layer (HVL) measurement into a region that is less influenced by low-energy components of the beam of X-rays.

9. The linear accelerator of claim 1, wherein the attenuating element is configured to shift data corresponding to a half value layer (HVL) measurement into a region based on an end-point energy of the linear accelerator.

10. The linear accelerator of claim 1, wherein the beam of electrons is alternately accelerated to at least a first peak energy of approximately 6 MeV and to a second peak energy of approximately 4 MeV.

11. The linear accelerator of claim 1, wherein the reference detector is further configured to generate a half value layer (HVL) value on a pulse-by-pulse basis.

12. The linear accelerator of claim 11, wherein the calorimeter comprises a first detector element and at least one subsequent detector element, thereby forming a stacked array of detector elements.

13. The linear accelerator of claim 12, wherein the computing device is configured to measure said HVL value by:
   acquiring X-ray intensity data from the first detector element and the at least one subsequent detector element;
   determining a ratio of a natural logarithm of the X-ray intensity data to a natural logarithm of 2 corresponding to each of the first detector element and the at least one subsequent detector element;
   determining a gradient of the ratio as a function of a cumulative attenuating thickness of material comprising each of the first detector element and the at least one subsequent detector element; and
   generating the HVL value by determining a negative reciprocal of the gradient.

14. The linear accelerator of claim 11, wherein the computing device is configured to:
   determine a relationship between material separation curves of at least a first material and a second material in a scanned object formed by modifying high energies and low peak energies of the pulses of said beam of X-rays and corresponding HVL value measurements for each of said pulses; and
   use a calibration curve, based on said HVL value measurements for each of said pulses, to colorize the image data for material identification.

15. The linear accelerator of claim 1, further comprising a memory configured to store at least one predefined threshold X-ray radiation dose value, wherein said computing device and/or programmable logic is configured to deactivate said linear accelerator if the X-ray radiation dose output approaches or exceeds said at least one predefined threshold X-ray radiation dose value.

16. The linear accelerator of claim 1, wherein using a function of the reference correction factor and data indicative of an amount of light per pixel in the image data to calculate a value that is independent of the X-ray radiation dose output comprises dividing the reference correction factor by the data indicative of an amount of light per pixel in the image data to calculate a value that is independent of the X-ray radiation dose output.

17. The linear accelerator of claim 1, wherein using a function of the reference correction factor and data indicative of an amount of light per pixel in the image data to calculate a value that is independent of the X-ray radiation dose output comprises using a function of the reference correction factor and average data indicative of an amount of light per pixel in the image data to calculate a value that is independent of the X-ray radiation dose output.

18. The linear accelerator of claim 1, wherein using a function of the reference correction factor and data indicative of an amount of light per pixel in the image data to calculate a value that is independent of the X-ray radiation dose output comprises using a function of the reference correction factor and data indicative of an amount of light per pixel in the image data to calculate a ratio that is independent of the X-ray radiation dose output.

19. A linear accelerator comprising:
a target;
an electron gun, wherein the electron gun is configured to direct an accelerated beam of electrons at the target thereby generating a beam of X-rays;
a primary collimator positioned beyond the target along a direction of the beam of X-rays;
a secondary collimator coupled to an end of the primary collimator where the beam of X-rays exits the primary collimator;
an attenuating element positioned within the primary collimator and configured to shift an acquisition of X-ray data into a region less influenced by low-energy components of the beam of X-rays and into a region more influenced by an end-point energy of the linear accelerator; and
a detector positioned within the secondary collimator and configured to measure an X-ray radiation dose output of the linear accelerator on a pulse-by-pulse basis, wherein said detector is enclosed within a housing defined by two parallel copper plates separated by a predefined fixed distance.

20. The linear accelerator of claim 19, wherein said secondary collimator comprises a cover plate, a top support, a first side plate, a second side plate, a first set of collimating jaws, a collimator adjustment assembly and a second set of collimating jaws.

21. The linear accelerator of claim 19, further comprising a dehumidifier positioned within the housing.

22. The linear accelerator of claim 19, wherein the attenuating element comprises approximately 6 inches of steel.

* * * * *